(12) United States Patent
Schelfaut et al.

(10) Patent No.: US 11,939,070 B2
(45) Date of Patent: Mar. 26, 2024

(54) ENGINE-MOUNTING LINKS THAT HAVE AN ADJUSTABLE INCLINATION ANGLE

(71) Applicant: General Electric Company, Schenectady, NY (US)

(72) Inventors: Timothy Leo Schelfaut, Liberty Township, OH (US); Anthony Michael Metz, Harrison, OH (US); Jonathan Edward Coleman, Mason, OH (US); Thomas P. Joseph, West Chester, OH (US); Michael C. Borner, Fairfield, OH (US); Mahesh Khandeparker, Bengaluru (IN); Kudum Shinde, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 689 days.

(21) Appl. No.: 16/797,078

(22) Filed: Feb. 21, 2020

(65) Prior Publication Data

US 2021/0261262 A1    Aug. 26, 2021

(51) Int. Cl.
 *B64D 27/26*    (2006.01)
(52) U.S. Cl.
 CPC ........ *B64D 27/26* (2013.01); *B64D 2027/268* (2013.01)
(58) Field of Classification Search
 CPC .............. B64D 27/26; B64D 2027/268; B64D 2027/266
See application file for complete search history.

(56) References Cited

U.S. PATENT DOCUMENTS

| 3,300,349 | A | 1/1967 | Alfred |
| 3,356,550 | A | 12/1967 | Stiffler |
| 3,649,584 | A | 3/1972 | Bailey |
| 4,050,660 | A | 9/1977 | Eggmann et al. |
| 4,383,798 | A | 5/1983 | Schucker |
| 4,405,283 | A | 9/1983 | Owsianny |
| 4,541,774 | A | 9/1985 | Rieck et al. |
| 4,882,902 | A | 11/1989 | Reigel et al. |
| 5,012,420 | A | 4/1991 | Walker et al. |

(Continued)

FOREIGN PATENT DOCUMENTS

| EP | 1301715 B1 | 5/2007 |
| EP | 2133268 B1 | 7/2016 |

*Primary Examiner* — Christopher D Hutchens
*Assistant Examiner* — Steven J Shur
(74) *Attorney, Agent, or Firm* — Venable LLP; Peter T. Hrubiec; Michele V. Frank

(57) ABSTRACT

Engine-mounting linkage systems may include a plurality of engine mounting links configured to couple an engine frame to an engine support structure of an aircraft. The plurality of engine-mounting links may include a forward link that is connectable to a forward frame portion of the engine frame and the engine support structure, and an aft link that is connectable to an aft frame portion of the engine frame and the engine support structure. The engine mounting linkage system may include an actuator that is connectable to the engine support structure and one of the plurality of engine-mounting links, or to the engine support structure and the engine frame. The actuator, when actuated, changes an inclination angle θ of at least one of the plurality of engine-mounting links.

20 Claims, 16 Drawing Sheets

(56) References Cited

U.S. PATENT DOCUMENTS

| | | | |
|---|---|---|---|
| 5,319,922 A | * | 6/1994 | Brantley ................ F01D 25/24 244/54 |
| 5,320,307 A | | 6/1994 | Spofford et al. |
| 5,385,013 A | | 1/1995 | Barron et al. |
| 5,443,229 A | | 8/1995 | O'Brien et al. |
| 5,452,575 A | | 9/1995 | Freid |
| 5,722,813 A | | 3/1998 | Li et al. |
| 6,279,322 B1 | | 8/2001 | Moussa |
| 6,361,277 B1 | | 3/2002 | Bulman et al. |
| 6,487,491 B1 | | 11/2002 | Karpman et al. |
| 6,540,481 B2 | | 4/2003 | Moussa et al. |
| 7,021,585 B2 | | 4/2006 | Loewenstein et al. |
| 7,025,566 B2 | | 4/2006 | Sasu et al. |
| 7,063,290 B2 | | 6/2006 | Marche |
| 7,442,006 B2 | | 10/2008 | Nguyen et al. |
| 7,789,200 B2 | | 9/2010 | Munson |
| 8,001,791 B2 | | 8/2011 | Somanath et al. |
| 8,177,488 B2 | | 5/2012 | Manteiga et al. |
| 8,215,580 B2 | | 7/2012 | Balk |
| 8,240,600 B2 | | 8/2012 | Balk |
| 8,443,612 B2 | | 5/2013 | Foster |
| 8,469,309 B2 | | 6/2013 | Stuart et al. |
| 8,727,269 B2 | | 5/2014 | Stuart et al. |
| 8,904,746 B2 | | 12/2014 | Fang et al. |
| 8,950,702 B2 | | 2/2015 | Cloft |
| 8,950,724 B2 | | 2/2015 | Hurst et al. |
| 9,062,883 B2 | | 6/2015 | Widener et al. |
| 9,217,337 B2 | | 12/2015 | Sandy et al. |
| 9,328,630 B2 | | 5/2016 | Brochard et al. |
| 9,482,384 B2 | | 11/2016 | Stuble |
| 9,592,909 B2 | | 3/2017 | Cranga et al. |
| 9,701,412 B2 | | 7/2017 | Stretton et al. |
| 9,708,982 B2 | | 7/2017 | Chouard et al. |
| 2011/0192933 A1 | * | 8/2011 | Guering ................ B64D 27/26 244/54 |
| 2012/0272663 A1 | | 11/2012 | Moussa et al. |
| 2012/0305700 A1 | | 12/2012 | Stuart et al. |
| 2013/0200211 A1 | | 8/2013 | Zheng et al. |
| 2015/0052872 A1 | | 2/2015 | Zurmehly et al. |
| 2015/0060042 A1 | | 3/2015 | Shilpiekandula et al. |
| 2015/0323107 A1 | | 11/2015 | Ott et al. |
| 2016/0167798 A1 | * | 6/2016 | Prentice ................ B64C 19/00 244/54 |
| 2016/0175984 A1 | | 6/2016 | Dalle Donne et al. |
| 2016/0201848 A1 | | 7/2016 | Bordne et al. |
| 2016/0238075 A1 | | 8/2016 | Clark et al. |
| 2016/0245181 A1 | | 8/2016 | Butcher et al. |
| 2017/0058762 A1 | | 3/2017 | Marques et al. |
| 2017/0217595 A1 | | 8/2017 | Baldwin et al. |
| 2017/0259929 A1 | | 9/2017 | Stuart |
| 2018/0162541 A1 | * | 6/2018 | Jasklowski ............ B64D 29/02 |
| 2018/0362170 A1 | | 12/2018 | Stuart et al. |
| 2019/0185170 A1 | | 6/2019 | Schelfaut et al. |
| 2020/0017212 A1 | * | 1/2020 | Easley .................... B64C 29/02 |

* cited by examiner

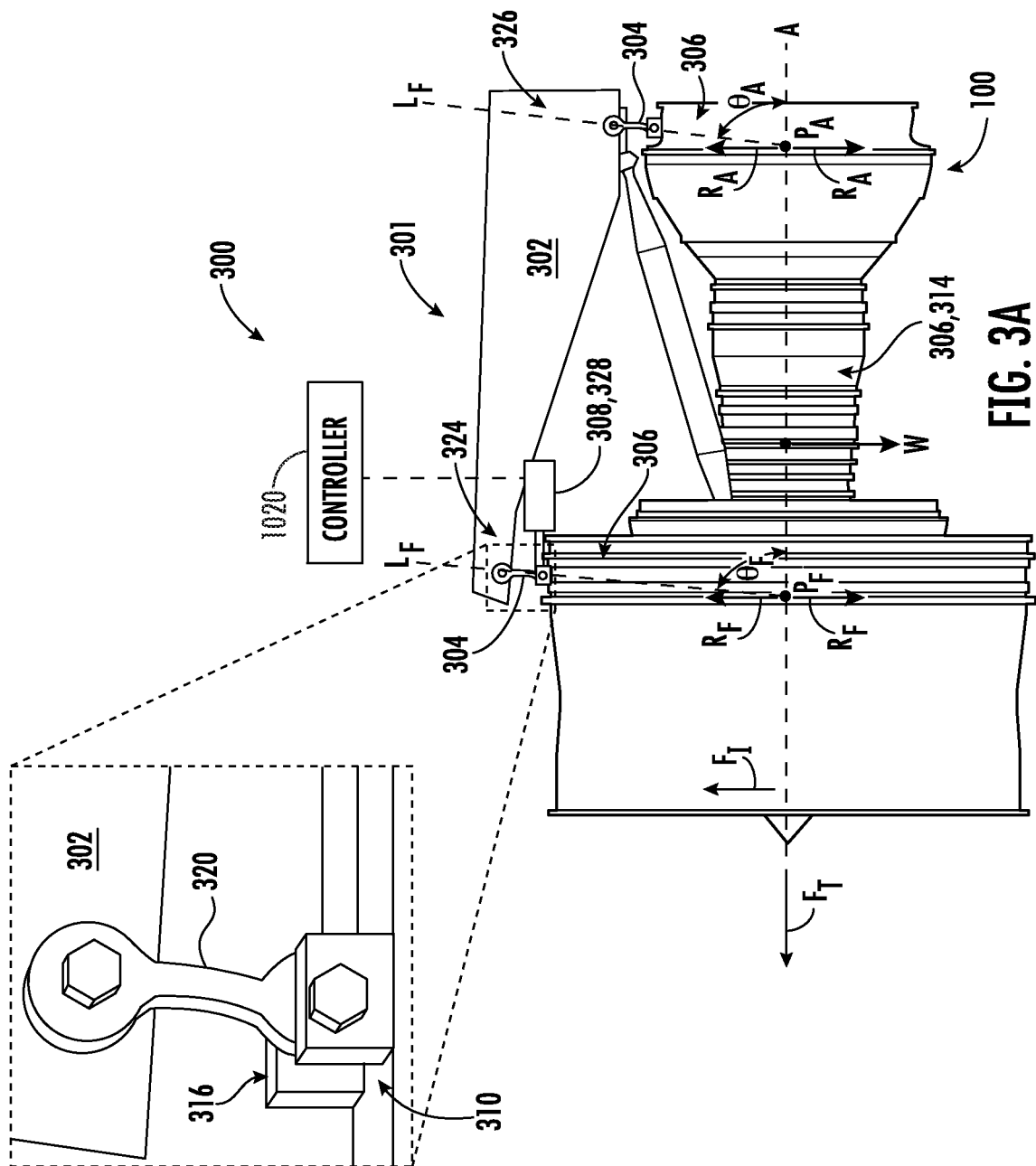

ENGINE-MOUNTING LINKS THAT HAVE AN ADJUSTABLE INCLINATION ANGLE

FIELD

The present disclosure generally pertains to systems and methods for mounting an aircraft engine to an aircraft. More particularly, the present disclosure pertains systems and methods that utilize engine-mounting links that have an adjustable inclination angle.

BACKGROUND

Aircraft engines such as turbomachines may be mounted to an aircraft at various locations such as the wings, fuselage, or tail. Aircraft engines include gas turbine powered engines, electric engines, hybrid engines, and piston engines. The engine is typically mounted at axially spaced apart forward and aft or front and rear positions by an engine support structure that includes corresponding forward and aft or front and rear mounts for carrying various loads to the aircraft. The loads typically include vertical loads such as the weight of the engine itself, axial thrust loads generated by the engine, lateral loads such as those due to wind buffeting, and roll loads or moments due to rotary operation of the engine. The mounts accommodate both axial and radial thermal expansion and contraction of the engine relative to the engine support structure.

These various loads may cause a certain amount of deflection or bending of the engine. Engine deflecting or bending may impact engine operating clearances of rotational components of the engine, such as blade tip clearances within the fan, compressor, and/or turbine sections of the engine. Typically, an engine operates with sufficiently sized clearances to avoid blade tip rub encounters with surrounding engine structures.

The configuration and arrangement of the engine mounts can have certain effects on engine deflection or bending. A reduction in engine deflection or bending may reduce the incidence of blade tip rub encounters, which may allow for narrower blade tip clearances within the within the fan, compressor, and/or turbine sections of the engine. Such narrower blade tip clearances may improve engine specific fuel consumption (SFC).

Accordingly, there exists a need for improved systems and methods for mounting an aircraft engine to an aircraft.

BRIEF DESCRIPTION

Aspects and advantages of the present disclosure will be set forth in part in the following description, or may be obvious from the description, or may be learned through practice of the presently disclosed subject matter.

In one aspect, the present disclosure embraces engine-mounting linkage systems. An exemplary engine-mounting linkage system may include a plurality of engine mounting links configured to couple an engine frame to an engine support structure of an aircraft. The plurality of engine-mounting links may include a forward link that is connectable to a forward frame portion of the engine frame and the engine support structure. The plurality of engine-mounting links may additionally or alternatively include and an aft link that is connectable to an aft frame portion of the engine frame and the engine support structure.

In some embodiments, an exemplary engine-mounting linkage system may include an actuator that is connectable to the engine support structure and one of the plurality of engine-mounting links. Additionally, or in the alternative, an exemplary engine-mounting linkage system may include an actuator that is connectable to the engine support structure and the engine frame. An actuator may be configured such that, when actuated, the actuator changes an inclination angle $\theta$ of at least one of the plurality of engine-mounting links.

In another aspect, the present disclosure embraces engine assemblies, such as engine assemblies secured or securable to an aircraft. An exemplary engine assembly may include an aircraft engine that has an engine frame with a forward frame portion and an aft frame portion. An engine assembly may additionally, or alternatively, include an engine support structure that defines a location for mounting the aircraft engine to an aircraft.

An exemplary engine assembly may include a forward link, an aft link, and/or an actuator. The forward link m ay be connected to the forward frame portion of the engine frame and to the engine support structure of the aircraft. The aft link may be connected to the aft frame portion of the engine frame and to the engine support structure of the aircraft.

In exemplary embodiments, an actuator may be connected to the engine support structure and the forward link, or to the engine support structure and the aft link. Additionally, or in the alternative, an actuator may be coupled to the engine support structure and the forward frame portion of the engine frame, or to the engine support structure and the aft frame portion of the engine frame; The actuator(s), when actuated, may be operable to change an inclination angle $\theta$ of at least one of the forward link and/or the aft link.

In yet another aspect, the present disclosure embraces method of operating an aircraft, such as methods of chaining an inclination angle $\theta$, methods of reducing specific fuel consumption, and so forth. An exemplary method may include receiving an input from a sensor, and/or outputting a control command responsive to the input from the sensor. The control command may be operable to actuate an actuator that, when actuated, causes a change to an inclination angle $\theta$ of at least one of a plurality of engine-mounting links that connect an engine frame of an aircraft engine to an engine support structure that defines a location for mounting the aircraft engine to an aircraft. The plurality of engine-mounting links may include a forward link that is connected to a forward frame portion of the engine frame and the engine support structure, and/or an aft link that is connected to an aft frame portion of the engine frame and the engine support structure. The actuator may be connected to the engine support structure and one of and the plurality of engine-mounting links, or to the engine support structure and the engine frame.

In yet another aspect, a method of controlling a link operably coupling an engine with an engine support structure is provided. The method includes determining a control command based at least in part on an output received from one or more sensors. Further, the method includes causing an actuator operably coupled with the link to change a position of the link based at least in part on the determined control command.

In a further aspect, a control system for controlling a link configured to operably couple an engine to an engine mounting structure of a vehicle is provided. The control system includes one or more sensors and an actuator operably couplable with the link. The actuator is operable to change an inclination angle of the link. Further, the control system includes one or more controllers communicatively coupled with the one or more sensors and the actuator. The one or more controllers having one or more memory devices and one or more processing devices, the one or more memory devices storing computer-readable instructions that can be executed by the one or more processing devices to perform operations, in performing the operations, the one or more processing devices are configured to: determine a control command based at least in part on an output received from the one or more sensors; and cause the actuator to change the inclination angle of the link based at least in part on the determined control command.

In another aspect, a computer readable medium is provided. The computer readable medium includes computer-executable instructions, which, when executed by one or more processors of an engine controller, cause the engine controller to: cause an actuator operably couplable with a link configured to operably couple an engine with an engine mounting structure to vary an inclination angle of the link to a plurality of preselected inclination angles; receive, for respective ones of the plurality of preselected inclination angles, a value for one or more operating parameters associated the respective ones of the plurality of preselected inclination angles; generate a dataset relating the plurality of preselected inclination angles to the values for the one or more operating parameters, the received values depending at least in part on the inclination angle associated therewith; and select the inclination angle based at least in part on the dataset, the selected inclination angle corresponding to a value for one of the one or more operating parameters. The computer readable medium can be a non-transitory computer-readable medium, for example.

In another aspect, a method of controlling a link angle of a link operatively coupling an engine with a mounting structure is provided. The method includes determining a control command based at least in part on one or more operating parameters received from one or more sensors, the control command indicative of instructions for varying the link angle of the link. Further, the method includes providing the control command to an actuator operable to vary the link angle based at least in part on the determined control command.

These and other features, aspects and advantages of the presently disclosed subject matter will become better understood with reference to the following description and appended claims. The accompanying drawings, which are incorporated in and constitute a part of this specification, illustrate embodiments of the present disclosure and, together with the description, serve to explain the principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended figures, in which:

FIGS. 3A and 3B show an exemplary engine-mounting linkage system with a forward-mounted actuator respectively situated at an aft position and at a forward position;

DETAILED DESCRIPTION

Figure 1:
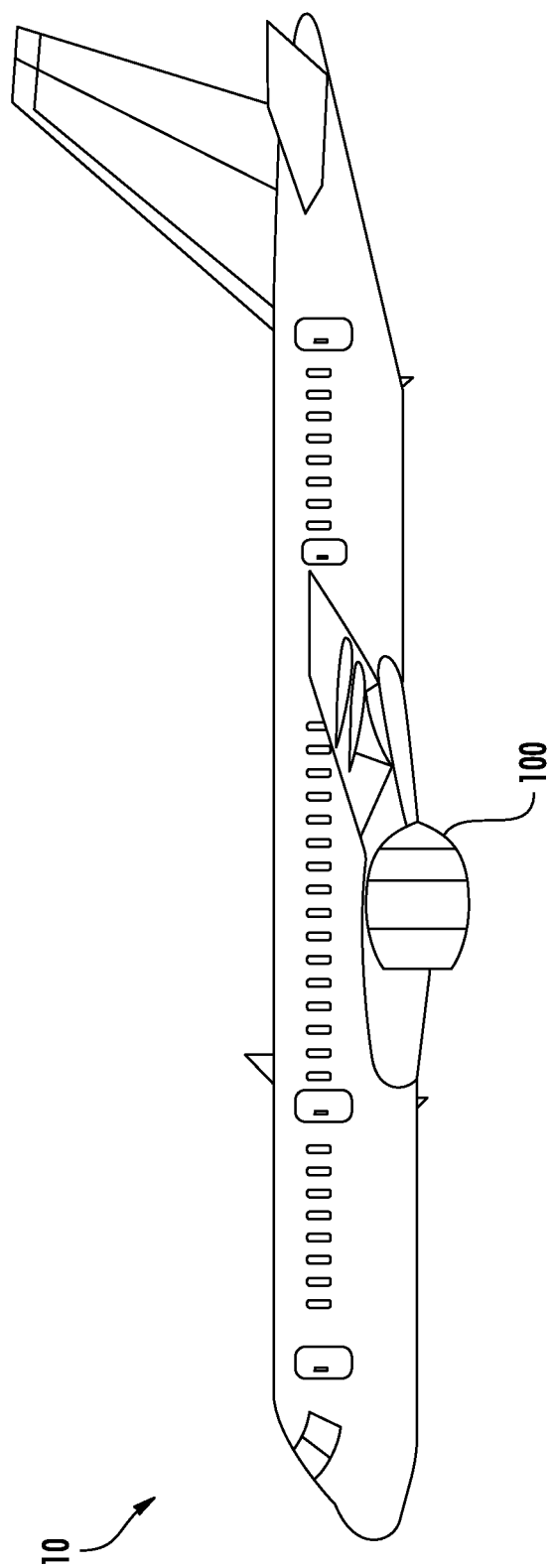
FIG. 1 provides a vehicle according to example embodiments of the present disclosure.

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally provides engine-mounting linkage systems for mounting an aircraft engine to an engine support structure of an aircraft. The presently disclosed engine-mounting linkage systems may include one or more engine-mounting links that have an adjustable inclination angle. The inclination angle may be adjusted by operation of an actuator. A change in inclination angle θ of one or more engine-mounting links may move corresponding focal points of force vectors extending from such engine-mounting links. In some embodiments, movement of such focal points may counteract or offset moments (e.g., bending moments) associated with certain flight conditions and/or engine operating conditions that may otherwise cause a certain amount of deflection or bending of the engine backbone. One or more actuators may be actuated to change an inclination angle θ of one or more engine-mounting links, thereby reducing engine deflection or bending. A reduction in engine deflection or bending may reduce the incidence of blade tip rub encounters, which may allow for narrower blade tip clearances within the within the fan, compressor, and/or turbine sections of the engine. Such narrower blade tip clearances may improve engine specific fuel consumption (SFC).

In another aspect, the present disclosure provides a control system and methods for controlling the position of one or more engine-mounting links of an engine-mounting linkage system. For instance, the control system and methods provided herein can be used to control the inclination angle of any of the engine-mounting links described herein, e.g., to minimize engine bending or to optimize another engine parameter in real time, such as specific fuel consumption.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Furthermore, as used herein, the term "real time" refers to at least one of the time of occurrence of the associated events, the time of measurement and collection of predetermined data, the time to process the data, and the time of a system response to the events and the environment. In the embodiments described herein, these activities and events occur effectively instantaneously.

FIG. 1 provides a vehicle 10 according to example embodiments of the present disclosure. The engine-mounting linkage systems, methods therefore, and control systems thereof of the present disclosure can be implemented on an aircraft, such as a fixed-wing aircraft as shown, or on other suitable vehicles and/or structures, such as boats, submarines, trains, tanks, rotorcrafts, hovercrafts, and/or any other suitable vehicles that include one or more engines, such as one or more turbine engines(s) 100 (only one depicted in FIG. 1). While the present disclosure is described herein with reference to an aircraft implementation, the scope of the present disclosure in not intended to be limited to such implementations.

Turbine engines can be operated in various operating phases. For instance, the aircraft gas turbine engines 100 of FIG. 1 can be operated in a number of stable operation phases, such as the climb, cruise, and descent phases of a flight envelope. Aircraft turbine engines can also be operated in non-stable operation phases, such as during takeoff and enemy evasion scenarios. In some non-stable operation phases, e.g., during takeoff, the strain on the engine can be significant due to the various forces acting thereon. Particularly, the strain can cause engine bending and/or distortion of the engine backbone, which can result in reduced specific fuel consumption and efficiency, flowpath steps, and can increase the rate of deterioration of engine components, among other undesired effects. In stable operation phases, generally, the forces acting on the engine are less significant than those at non-stable phases. As will be explained in detail herein, engine-mounting systems and methods thereof as well as control system therefore are provided to reduce engine bending during operation of the turbine engines 100 in non-stable operation phases while optimizing one or more objective criteria during operation in stable operation phases.

Figure 2:
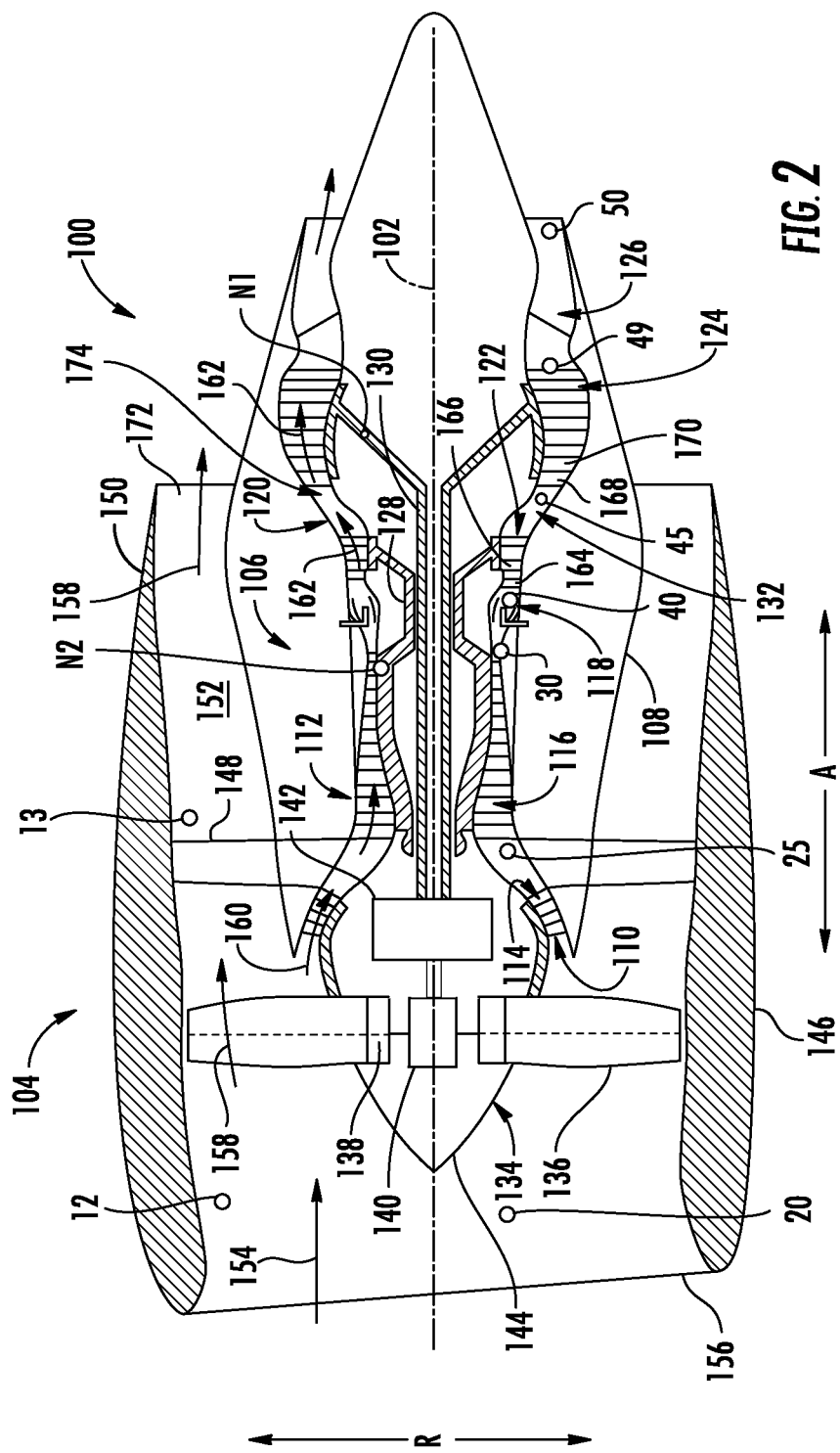
FIG. 2 provides a schematic cross-sectional view of a gas turbine engine according to example embodiments of the present disclosure.

FIG. 2 provides a schematic cross-sectional view of an aircraft turbine engine 100 according to example embodiments of the present disclosure. For the embodiment of FIG. 2, the turbine engine 100 is an aeronautical, high-bypass turbofan jet engine configured to be mounted to or integral with a vehicle, such as the fixed-wing aircraft 10 of FIG. 1. The gas turbine engine 100 defines an axial direction A (extending parallel to or coaxial with an axial or longitudinal centerline 102 provided for reference), a radial direction R, and a circumferential direction (a direction extending three hundred sixty degrees (360°) around the longitudinal centerline 102).

The gas turbine engine 100 includes a fan section 104 and a core turbine engine 106 disposed downstream of the fan section 104. The example core turbine engine 106 depicted includes a substantially tubular outer casing 108 that defines an annular core inlet 110. The outer casing 108 encases, in a serial flow relationship, a compressor section 112 including a first, booster or low pressure (LP) compressor 114 and a second, high pressure (HP) compressor 116; a combustion section 118; a turbine section 120 including a first, HP turbine 122 and a second, LP turbine 124; and a jet exhaust nozzle section 126. An HP shaft or spool 128 drivingly connects the HP turbine 122 to the HP compressor 116. An LP shaft or spool 130 drivingly connects the LP turbine 124 to the LP compressor 114. The compressor section 112, combustion section 118, turbine section 120, and jet exhaust nozzle section 126 together define a core air flowpath 132 through the core turbine engine 106.

The fan section 104 includes a fan 134 having a plurality of fan blades 136 coupled to a disk 138 in a circumferentially spaced apart manner. The fan blades 136 extend outwardly from disk 138 generally along the radial direction R. The fan blades 136 and disk 138 are together rotatable about the longitudinal centerline 102 by the LP shaft 130 across a power gear box 142. The power gear box 142 includes a plurality of gears for stepping down the rotational speed of the LP shaft 130, e.g., for a more efficient rotational fan speed.

Referring still to FIG. 2, the disk 138 is covered by a rotatable spinner 144 aerodynamically contoured to promote an airflow through the plurality of fan blades 136. Additionally, the fan section 104 includes an annular fan casing 146 that circumferentially surrounds the fan 134 and/or at least a portion of the core turbine engine 106. Moreover, the fan casing 146 is supported relative to the core turbine engine 106 by a plurality of circumferentially spaced outlet guide vanes 148. Further, a downstream section 150 of the fan casing 146 extends over an outer portion of the core turbine engine 106 so as to define a bypass airflow passage 152 therebetween.

During operation of the gas turbine engine 100, a volume of air 154 enters the gas turbine engine 100 through an associated inlet 156 of the fan casing 146 and/or fan section 104. As the volume of air 154 passes across the fan blades 136, a first portion of the air 154, as indicated by arrows 158, is directed or routed into the bypass airflow passage 152 and a second portion of the air 154, as indicated by arrow 160, is directed or routed into core inlet 110 and downstream to the LP compressor 114 of the core turbine engine 106. The pressure of the second portion of air 160 is increased as it is routed through the HP compressor 116 and into the combustion section 118.

The compressed second portion of air 160 discharged from the compressor section 112 mixes with fuel and is burned within a combustor of the combustion section 118 to provide combustion gases 162. The combustion gases 162 are routed from the combustion section 118 along a hot gas path 174 to the HP turbine 122. At the HP turbine 122, a portion of thermal and/or kinetic energy from the combustion gases 162 is extracted via sequential stages of HP turbine stator vanes 164 that are coupled to the outer casing 108 and HP turbine rotor blades 166 that are coupled to the HP shaft or spool 128, thus causing the HP shaft or spool 128 to rotate, which supports operation of the HP compressor 116. The combustion gases 162 are then routed through the LP turbine 124 where a second portion of thermal and kinetic energy is extracted from the combustion gases 162 via sequential stages of LP turbine stator vanes 168 that are coupled to the outer casing 108 and LP turbine rotor blades 170 that are coupled to the LP shaft or spool 130, thus causing the LP shaft or spool 130 to rotate, which supports operation of the LP compressor 114 and/or rotation of the fan 134.

The combustion gases 162 are subsequently routed through the jet exhaust nozzle section 126 of the core turbine engine 106 to produce propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also producing propulsive thrust. The HP turbine 122, the LP turbine 124, and the jet exhaust nozzle section 126 at least partially define the hot gas path 174 for routing the combustion gases 162 through the core turbine engine 106.

With reference still to FIG. 2, it will be appreciated that the turbine engine 100 may be described with reference to certain stations, which may be stations set forth in SAE standard AS 755-D, for example. As shown, the stations can include, without limitation, a fan inlet primary airflow 20, a fan inlet secondary airflow 12, a fan outlet guide vane exit 13, an HP compressor inlet 25, an HP compressor discharge 30, an HP turbine inlet 40, an LP turbine inlet 45, an LP turbine discharge 49, and a turbine frame exit 50. Each station can have temperatures, pressures, mass flow rates, fuel flows, etc. associated with the particular station of the turbine engine 100. For example, a portion of air 154 at the LP turbine inlet 45 may have a particular temperature, pressure, and a mass flow. As further shown, the fan speed N1 is representative of the rotational speed of the LP shaft or spool 130 and the core speed N2 is representative of the rotation speed of the HP shaft or spool 128. As will be explained herein, sensors can be positioned at these and/or other stations of the turbine engine 100 for sensing various operating parameters during operation.

Referring now to FIGS. 3A and 3B, 4A and 4B, and 5A and 5B, exemplary engine-mounting linkage systems 300 will be described. FIGS. 3A and 3B, 4A and 4B, and 5A and 5B show an aircraft engine 100 mounted to an engine support structure 302 of an aircraft 10. Exemplary engine-mounting linkage systems 300 such as those shown in the figures may be used to mount an aircraft engine 100 to an engine support structure 302, providing an engine assembly 301 secured to an aircraft 10. The engine support structure 302 may be a pylon extending from the aircraft 10, such as from the wing, fuselage, or tail of the aircraft 10. In the case of an engine 100 mounted to a wing, the engine support structure 302 may extend downwardly beneath the wing.

As shown, an engine-mounting linkage systems 300 may include one or more engine-mounting links 304 configured to couple an engine frame 306 to an engine support structure 302 of an aircraft 10. An engine-mounting link 304 may have an adjustable inclination angle θ. The inclination angle θ of an engine-mounting link 302 refers to the angle between the longitudinal axis A of the engine 100 and the longitudinal axis L of the engine-mounting link 302. Additionally, or in the alternative, an engine-mounting link 304 may be pivotable in concert with angular adjustment of another engine-mounting link 304. For example, an exemplary engine-mounting linkage system 300 may include at least one engine-mounting link 304 that has an adjustable inclination angle θ and at least engine-mounting link 304 that is pivotable.

An engine-mounting linkage system 300 may further include an actuator 308 operable to change a position of at least one engine-mounting link 304. For example, the actuator 308 may be operable to change an inclination angle θ of at least one engine-mounting link 304. Additionally, or in the alternative, an actuator 308 may be operable to change a pivot position of at least one engine-mounting link 304, such as a pivotable engine-mounting link 304. An actuator 308 may be connected to an engine support structure 302 of the aircraft 10 and to an engine-mounting link 302. Additionally, or in the alternative, an actuator 308 may be connected to an engine support structure 302 and to an engine frame 306. When so connected, the actuator 308, when actuated, may be operable to change an inclination angle θ of the engine-mounting link 304 and/or a pivot position of the engine-mounting link 304.

The engine support structure 302 generally defines a location for mounting an aircraft engine 100 to an aircraft 10. An engine-mounting linkage system 300 may be used to secure the engine 100 to the engine support structure 302. The engine support structure 302 may be connected to a frame of the engine 100 that supports the rotating components of the engine 100. The engine frame 306 typically includes a forward frame portion 310, an aft frame portion 312, and an engine casing 314 that connects the forward and aft frame portions 310, 312. The forward frame portion 310 may be disposed generally about the fan section and/or the compressor section(s) of a turbomachine engine 100. The aft frame portion 312 may be disposed generally about the turbine section(s) of the engine 100. The engine casing 314 may sometimes be referred to as the backbone of the engine 100. An engine 100 may be mounted and secured to an engine support structure 302 using one or more engine mounts. In an exemplary embodiment, an engine frame 306 may include a forward engine mount 316 and/or an aft engine mount 318. The forward and/or aft engine mounts 316, 318 may define respective portions of the forward and aft engine frame 310, 312. Additionally, or in the alternative, the forward and/or aft engine mounts 316, 318 may be separate components respectively coupled to the forward and aft engine frame 310, 312.

An exemplary engine assembly 301 may include a plurality of engine-mounting links 304. The plurality of engine-mounting links 304 may include a forward link 320 and/or an aft link 322. A forward link 320 may operably couple the forward frame portion 310 of the engine 100 to the engine support structure 302 of the aircraft 10. For example, the forward link 320 may be coupled to the engine at a forward engine mount 316 and/or to a forward portion 324 of the engine support structure 302. Additionally, or in the alternative, an engine assembly 301 may include an aft link 322 operably coupling the aft frame portion 312 of the engine 100 to the engine support structure 301 of the aircraft 10. For example, the aft link 322 may be coupled to the engine at an aft engine mount 318 and/or to an aft portion 326 of the engine support structure 302.

An engine assembly 301 may further include one or more actuators 308 operable to change an inclination angle θ of the forward link 320 and/or the aft link 322. For example, an actuator 308 may be operable to change a forward inclination angle $\theta_F$ corresponding to a forward link 320. Additionally, or in the alternative, an actuator 308 may be operable to change an aft inclination angle $\theta_A$ corresponding to an aft link 322.

In some embodiments, an actuator 308 may be connected to the forward link and to the engine support structure 302 of the aircraft 10. Additionally, or in the alternative, an actuator 308 may be connected to the aft link 322 and to the engine support structure 302 of the aircraft 10. Further, in addition or in the alternative, an actuator 308 may be connected to the engine frame 306 and the engine support structure 302 of the aircraft 10, such as between the engine frame 306 and the engine support structure 302. For example, an actuator 308 may be connected to a forward frame portion 310, an aft frame portion 312, and/or an engine casing 314.

Figure 3B:
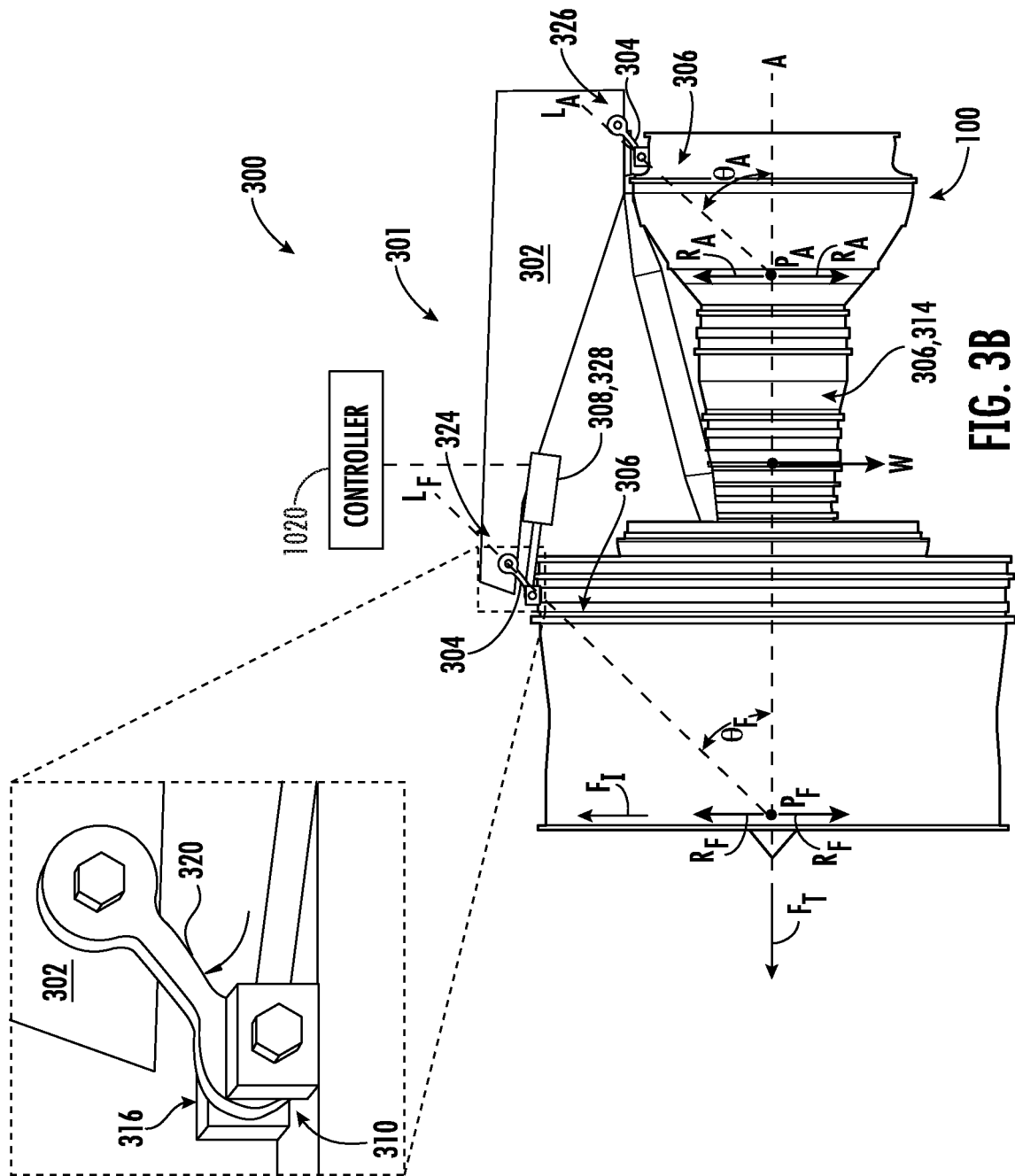

As shown in FIGS. 3A and 3B, in some embodiments an engine-mounting linkage system 300 may include a forward link 320 connected to the forward frame portion 310 of an engine 100 and to an engine support structure 302 of an aircraft 10. The forward link 320 may have an adjustable inclination angle θ, and the engine-mounting linkage system 300 may include an actuator 308, such as a forward actuator 328, connected to the forward link 320 and to the engine support structure 302 of the aircraft 10. The actuator 308 (e.g., the forward actuator 328) may be operable to adjust the position of the forward link 320 so as to change an inclination angle θ of the forward link 320, such as from a first inclination angle θ (e.g., FIG. 3A) to a second inclination angle θ (e.g., FIG. 3B).

In some embodiments, an engine-mounting linkage system 300 may include an additional engine-mounting link 304, such as an aft link 322, connected to the engine frame 306 and to the engine support structure 302 of the aircraft 10. For example, the aft link 322 may be connected to an aft frame portion 312 and to the engine support structure 302. The additional engine-mounting link 304 (e.g., the aft link 322) may have an adjustable inclination angle θ, and the actuator 308 (e.g., the forward actuator 328) may be operable to adjust the position of the aft link 322, so as to change an inclination angle θ of the aft link 322, such as from a first inclination angle θ (e.g., FIG. 3A) to a second inclination angle θ (e.g., FIG. 3B). Alternatively, the additional engine-mounting link 304 (e.g., the aft link 322) may be pivotable, such as in concert with an angular adjustment of the forward link 320.

Figure 4A:
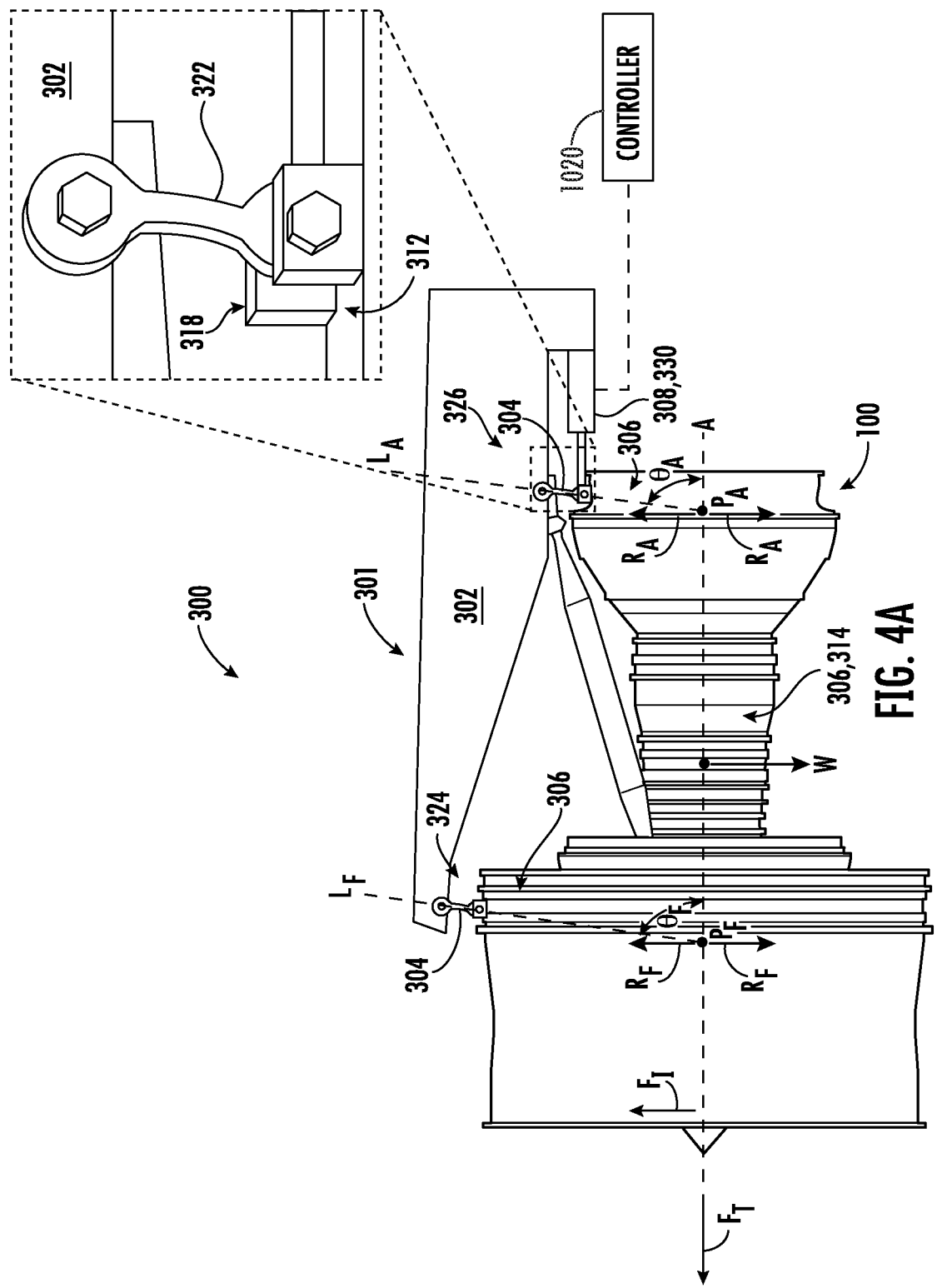
FIGS. 4A and 4B show an exemplary engine-mounting linkage system with an aft-mounted actuator respectively situated at an aft position and at a forward position.
Figure 4B:
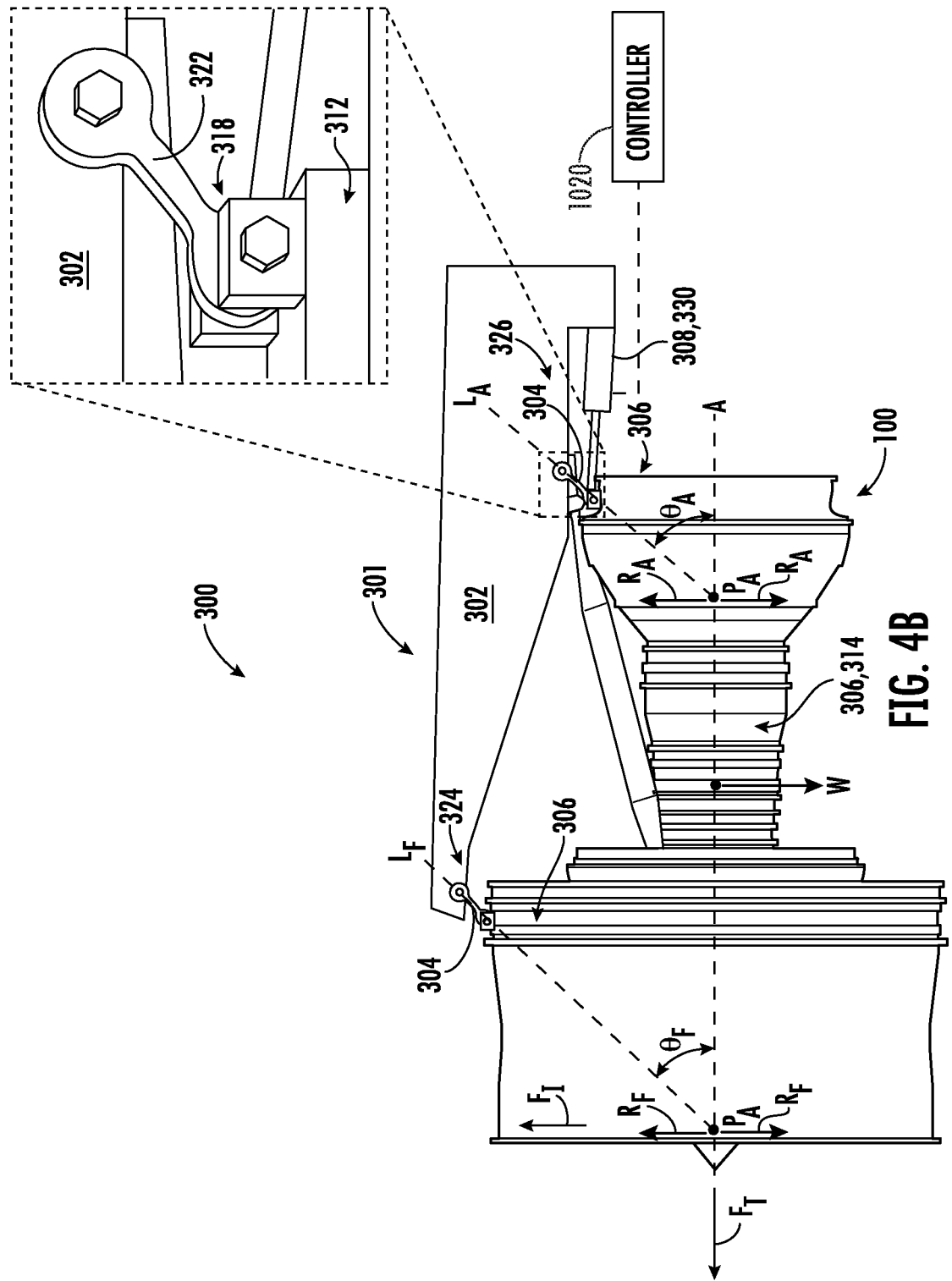

As shown in FIGS. 4A and 4B, in some embodiments an engine-mounting linkage system 300 may include an aft link 322 connected to the aft frame portion 312 of an engine 100 and to an engine support structure 302 of an aircraft 10. The aft link 322 may have an adjustable inclination angle θ, and the engine-mounting linkage system 300 may include an actuator 308, such as an aft actuator 330, connected to the aft link 322 and to the engine support structure 302 of the aircraft 10. The actuator 308 (e.g., the aft actuator 330) may be operable to adjust the position of the aft link 322, so as to change an inclination angle θ of the aft link 322, such as from a first inclination angle θ (e.g., FIG. 4A) to a second inclination angle θ (e.g., FIG. 4B).

In some embodiments, an engine-mounting linkage system 300 may include an additional engine-mounting link 304, such as a forward link 320, operably couplable between an engine frame 306 and the engine support structure 302 of an aircraft 10. For example, the forward link 320 may be connected to a forward frame portion 310 and to the engine support structure 302. The additional engine-mounting link 304 (e.g., the forward link 320) may have an adjustable inclination angle θ, and the actuator 308 (e.g., the aft actuator 330) may be operable to adjust a position of the forward link 320, so as to change an inclination angle θ of the forward link 320, such as from a first inclination angle θ (e.g., FIG. 4A) to a second inclination angle θ (e.g., FIG. 4B). Alternatively, the additional engine-mounting link 304 (e.g., the forward link 320) may be pivotable, such as in concert with an angular adjustment of the aft link 322.

Figure 5A:
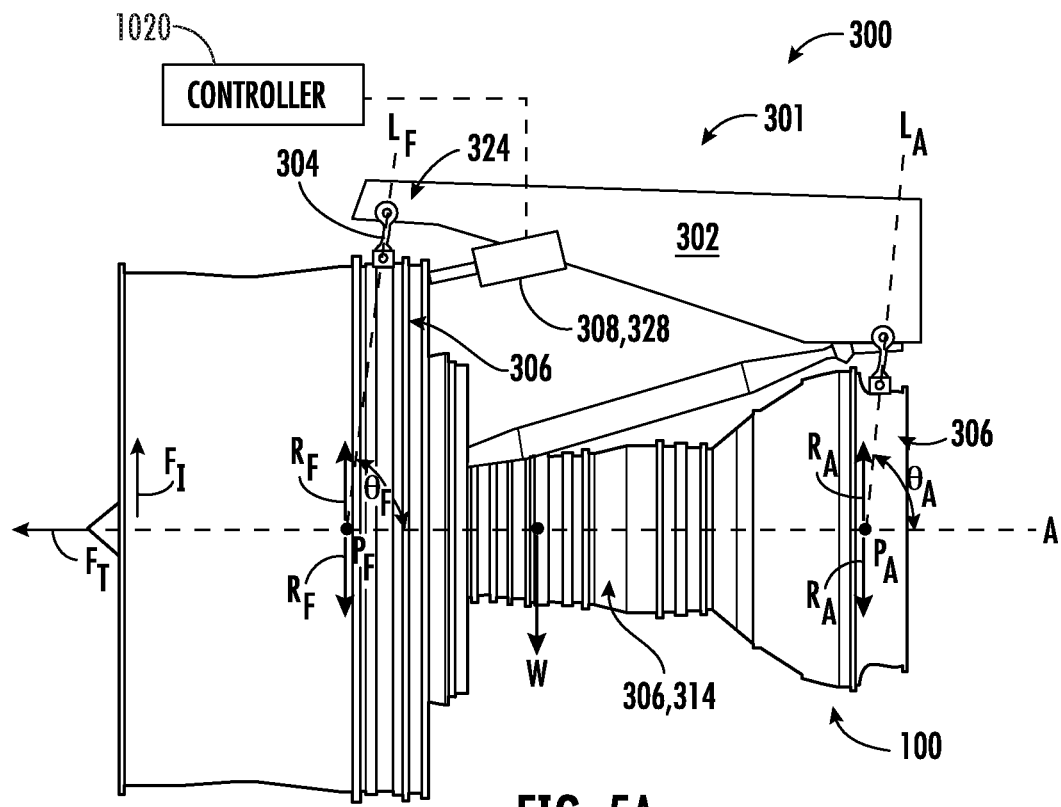
FIG. 5A shows an exemplary engine-mounting linkage system with a forward-mounted actuator operably coupled to an engine.

As shown in FIG. 5A, in some embodiments an engine-mounting linkage system 300 may include a forward link 320 operably couplable between the forward frame portion 310 of an engine 100 and an engine support structure 302 of an aircraft 10. The forward link 320 may have an adjustable inclination angle θ, and the engine-mounting linkage system 300 may include an actuator 308, such as a forward actuator 328, connected to the forward frame portion 310 and the engine support structure 302 of the aircraft. The engine-mounting linkage system 300 may include an additional engine-mounting link 304, such as an aft link 322, connected to the engine frame 306 (e.g., an aft frame portion 312) and the engine support structure 302 of the aircraft 10. The actuator 308 (e.g., the forward actuator 328) may be operable to adjust the position of the forward link 320 and/or the aft link 322, so as to change an inclination angle θ of the forward link 320 and/or the aft link 322, such as from a first inclination angle θ (e.g., FIG. 3A) to a second inclination angle θ (e.g., FIG. 3B). Alternatively, the additional engine-mounting link 304 (e.g., the aft link 322) may be pivotable, such as in concert with an angular adjustment of the forward link 320.

Figure 5B:
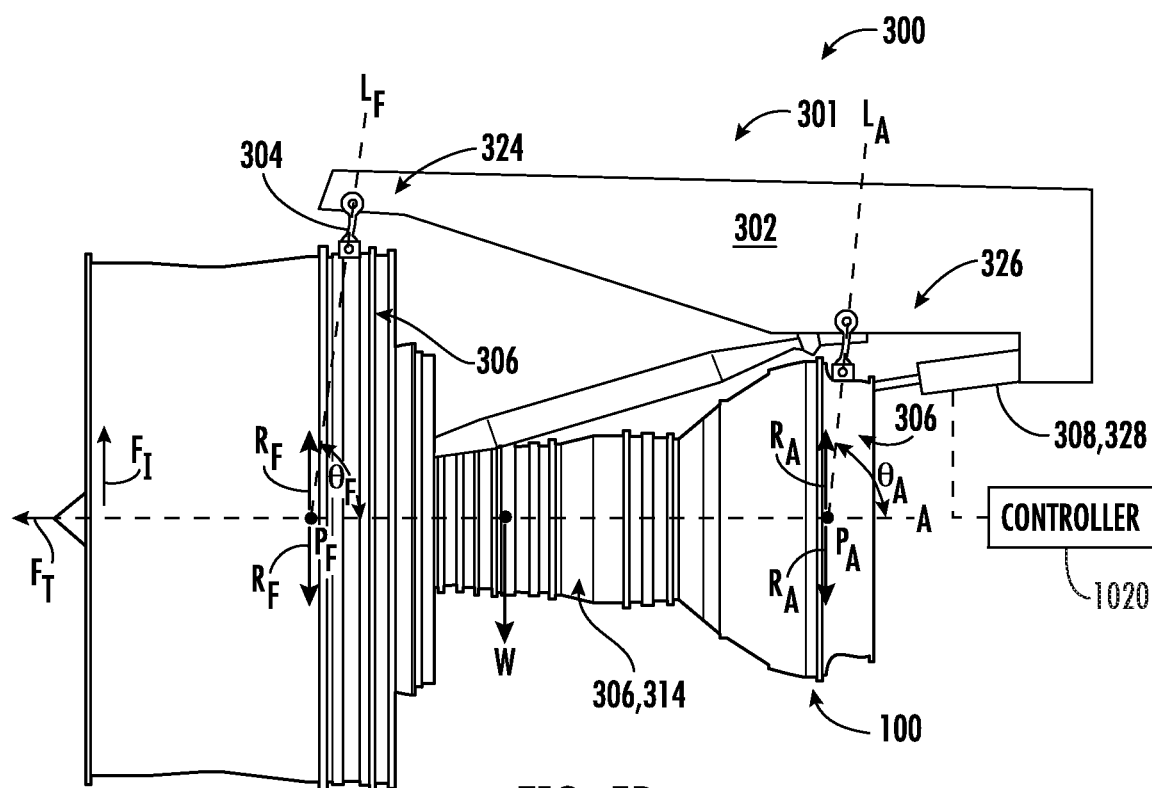
FIG. 5B shows an exemplary engine-mounting linkage system with an aft-mounted actuator operably coupled to an engine.

As shown in FIG. 5B, in some embodiments an engine-mounting linkage system 300 may include an aft link 322 operably couplable between the aft frame portion 312 and the engine support structure 302 of an aircraft 10. The aft link 322 may have an adjustable inclination angle θ, and the engine-mounting linkage system 300 may include an actuator 308, such as an aft actuator 330, connected to the aft frame portion 312 and the engine support structure 302 of the aircraft. The engine-mounting linkage system 300 may include an additional engine-mounting link 304, such as a forward link 320, connected to the engine frame 306 (e.g., a forward frame portion 310) and the engine support structure 302 of the aircraft 10. The actuator 308 (e.g., the aft actuator 330) may be operable to adjust a position of the aft link 322 and/or the forward link 320, so as to change an inclination angle θ of the aft link 322 and/or the forward link 320, such as from a first inclination angle θ (e.g., FIG. 3A) to a second inclination angle θ (e.g., FIG. 3B). Alternatively, the additional engine-mounting link (e.g., the forward link 320) may be pivotable, such as in concert with an angular adjustment of the aft link 322.

Referring still to FIGS. 3A and 3B, 4A and 4B, and 5A and 5B, the first and second inclination angles θ may correspond to a forward inclination angle $θ_F$ and/or an aft inclination angle $θ_A$. The forward inclination angle $θ_F$ may correspond to or differ from the aft inclination angle $θ_A$. The forward inclination angle $θ_F$ may be adjusted independently from the aft inclination angle $θ_A$. Additionally, or in the alternative, the aft inclination angle $θ_A$ may be adjusted independently from the forward inclination angle $θ_F$.

In some embodiments, an inclination angle θ of one or more engine-mounting links 304 may be adjusted so as to reduce backbone bending. For example, different inclination angles θ may be selected for different flight conditions or engine operating conditions, and one or more actuators 308 may be actuated so as to move the one or more engine-mounting links 304 to a desired inclination angle θ.

Force vectors transmitted through the engine-mounting linkage system 300 may intersect at one or more focal points, which may depend at least in part on the inclination angle θ of one or more engine-mounting links 304. These force vectors may include a vector of a force or forces transmitted through the forward link 320 and/or a vector of a force or forces transmitted through the aft link 322. Force vectors extending from the forward link 320 may intersect at a focal point $P_F$. Force vectors extending from the aft link 322 intersect at an aft focal point $P_A$. The location of the forward focal point $P_F$ and/or the location of the aft focal point $P_A$ may be moved by changing the inclination angle of the forward link 320 and/or the aft link 322.

During operation, an aircraft engine 100 is subjected to a thrust load, represented by the vector $F_T$. Additionally, during certain operating conditions, the engine 100 may be subjected to an inlet load, represented by the vector $F_I$. The inlet load may be an aerodynamically-induced load caused, for example, by the axis of rotation A being pitched relative to approaching airflow. As a result, a forward lip of the nacelle 144 may be subjected to upward aerodynamic loading. While the inlet load is shown as an upward or vertical vector, the inlet load may additionally or alternatively include a sideways or horizontal vector. Such a sideways or horizontal vector may be an aerodynamically-induced load attributable, for example, to turning or other aerial maneuvers and/or cross-winds, and so forth. As a result, the forward lip of the nacelle 144 may be subjected to sideways or horizontal aerodynamic loading. Similarly, aerodynamically-induced loads may provide force vectors oriented with respect to any angle incident upon the engine 100, subjecting the forward lip of the nacelle 144 to corresponding angular loading. These loads may induce bending moments in the engine casing 314 (e.g., the backbone), which may deflect or bend the engine casing 314 from its concentric position about the axis of rotation A. For example, a large inlet load inlet load $F_I$ may represent a major contribution to bending moment. Additionally, or in the alternative, thrust load $F_T$ may create a pitching moment, for example, depending on the axial location of the focal point of the engine-mounting linkage systems 300. Maintaining concentricity of the engine casing 314 about the axis of rotation A is important from the standpoint of minimizing blade tip clearances, which has the beneficial effect of improving engine specific fuel consumption (SFC) and fuel burn. In addition, reduced backbone bending reduces the incidence of blade tip rub encounters with the surrounding engine structures, which promotes in-service performance retention.

In some embodiments, the magnitude of a moment arm (e.g., a bending moment, a pitching moment, etc.) resulting from thrust load $F_T$, inlet load $F_I$, and/or the weight of the engine 100, represented by the vector W, may depend on the location of one or more focal points of the engine-mounting links 304 (e.g., a forward focal point $P_F$ and/or an aft focal point $P_A$), as well as the contributions from the various load vectors. The inclination angle θ of one or more engine-mounting links 304 may be varied, for example, to correspond to differing load vectors associated with various flight conditions and/or engine operating conditions. An adjustment to one or more inclination angles θ may thereby at least partly counteract one or more moments associated with such flight conditions and/or engine operating conditions.

By way of example, during certain conditions engine thrust $F_T$ may a forward vertical reaction $R_F$ at the forward focal point $P_F$ acting in an opposite direction to the weight W of the engine. Additionally, or in the alternative, engine thrust $F_T$ and/or inlet load $F_I$ may cause a forward reaction $R_F$ at the focal point $P_F$ acting in a downward direction. For example, this may be the case with increased inlet load $F_I$ associated with an increased angle of attack during liftoff and claiming conditions. Similarly, inlet load $F_I$ may cause a change in aft reaction $R_A$ acting in an upward direction. In some embodiments, the inclination angle θ of one or more engine-mounting links 304 may be changed so as to move the forward focal point $P_F$ and/or the aft focal point $P_A$ may decrease backbone bending attributable to increased inlet load $F_I$. For example, such increased inlet load $F_I$ may be present as a result of the aircraft 10 being in a climb, during which the nacelle 144 receives significant upward aerodynamic loading as a result of the axis of rotation A of the engine 100 being pitched upward relative to the direction of approaching airflow. As the aircraft 10 reaches cruise and levels out, inlet load $F_I$ may decrease and forward and aft reactions $R_F$ and $R_A$ return to reacting primarily with the weight W and thrust load $F_T$.

As another example, the engine thrust load $F_T$ and the inlet load $F_I$ may impose moments in the same or opposite directions around the forward focal point $P_F$ and/or the aft focal point $P_A$ depending, for example, on whether the focal point $P_F$ is above or below the axis of rotation A. These respective moments may at least partially cancel one another, for example, to the extent their distances relative to the forward focal point $P_F$ and/or the aft focal point $P_A$ are commensurate for the respective magnitudes of thrust load $F_T$ and inlet load $F_I$. By reducing the bending moment induced in gas turbine engine 100 by the inlet load Fi, and the thrust force Ft, the backbone of core engine 14 will be subjected to less bending or deflection.

Figure 6A:
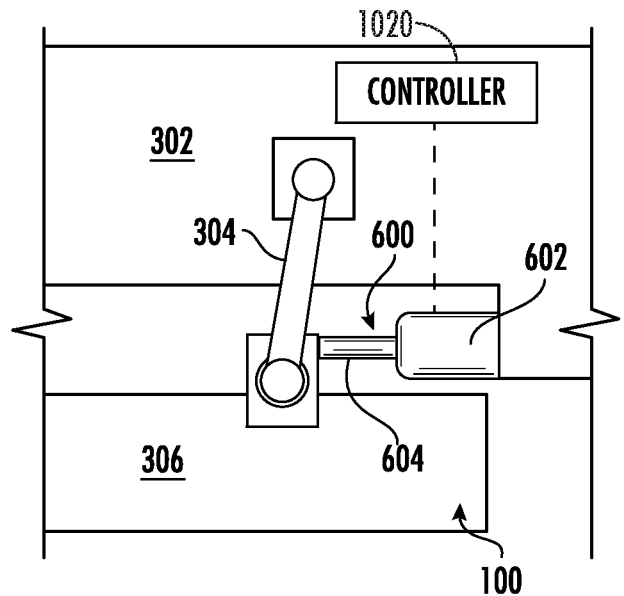
FIG. 6A shows an exemplary linear actuator.
Figure 6B:
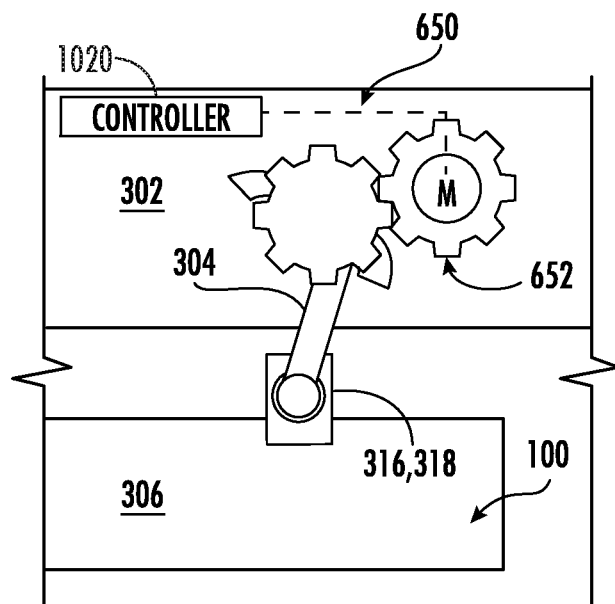
FIG. 6B shows an exemplary rotary actuator.

Referring now to FIGS. 6A and 6B, exemplary actuators 308 operable to change the inclination angle θ of an engine-mounting link 304 will be described. As shown in FIG. 6A, the actuator 308 may be a linear actuator 600. The linear actuator may include an actuator body 602 and an actuator arm 604. The actuator body 602 may be connected to the engine support structure 302, and the actuator arm 604 may be operable to change the inclination angle θ of the engine-mounting link 304. By way of example, an actuator arm 604 may be connected to the engine frame 306 and/or a forward or aft engine mount 316, 318. Alternatively, the actuator arm 604 may be connected to the engine support structure 302 and the actuator body 602 may be connected to the actuator arm 604, the engine frame 306, or a forward or aft engine mount 316, 318. The linear actuator 600 may be driven mechanically, hydraulically, and/or electrically, for example, responsive to a control command from a controller.

As shown in FIG. 6B, the actuator 308 may be a rotary actuator 650. A rotary actuator 650 may include a gear assembly 652 that includes one or more gears. The gear assembly 652 may operably couple the engine-mounting link 304 to a motor M 654, such as a servomotor. The motor 654 may be operable to rotate the gear assembly 652. The engine-mounting link 304 may be connected to the gear assembly 652, such that when the motor 654 rotates the gear assembly 652, the rotation of the gear assembly 652, in turn, changes inclination angle θ of the engine-mounting link 304. As shown, the gear assembly 652 may be connected to the engine support structure 302. Alternatively, the gear assembly 652 may be connected to the engine frame 306.

In some embodiments, a change in the inclination angle θ of one or more engine-mounting links 304 may shift the position of the engine 100 relative to the engine support structure. For example, as shown in FIGS. 3A and 3B, and 4A and 4B, it will be appreciated that the engine 100 may follow an engine-articulation pathway that includes a horizontal component (e.g., forward and aft motion) with extension and retraction of the actuator 308. Additionally, with the engine mounting links 304 as shown, it will be appreciated that the articulating pathway of the engine may also include a vertical component (e.g., up and down motion) with extension and retraction of the actuator 308. More particularly, the engine-mounting linkage system 300 shown in FIGS. 3A and 3B, and 4A and 4B may include engine-mounting links 304 with horizontal and vertical components that combine to provide a curved engine-articulation pathway. The curved engine-articulation pathway may be defined, for example, at least in part by the length of the one or more engine mounting links 304.

In other embodiments, an engine-mounting linkage system 300 may include further combinations of engine-mounting links 304 selected to provide any desired engine-articulation pathway. It will be appreciated that engine-mounting links 304 having different lengths may be combined to provide simple or complicated engine-articulation pathways, including parallel engine-articulation pathways and/or curved engine-articulation pathways.

Exemplary engine-mounting linkage system 300 may include any desired number of degrees of freedom. By way of example, an engine-mounting linkage system 300 may include a two-bar linkage, a four-bar linkage, a six-bar linkage, an eight-bar linkage, a 10-bar linkage, and so forth. In some embodiments, engine-mounting links 304 may provide a parallel engine-articulation pathway.

Figure 7A:
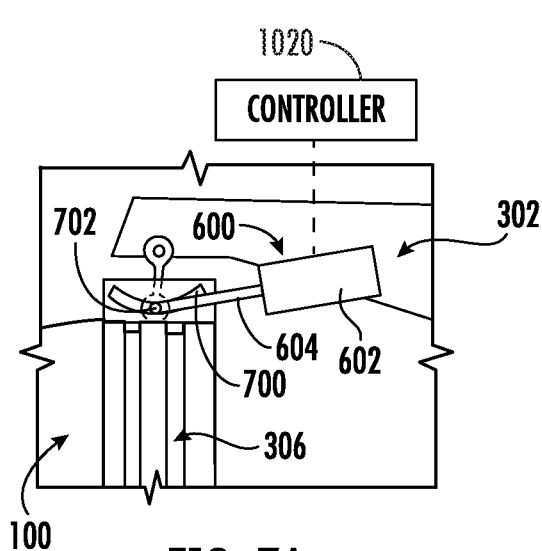
FIGS. 7A and 7B respectively show further exemplary actuators.
Figure 7B:
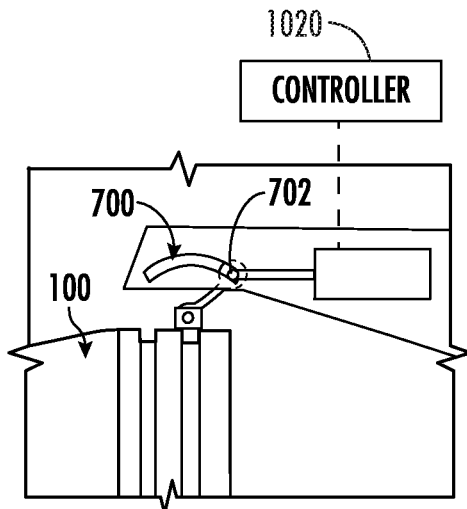
Figure 8A:
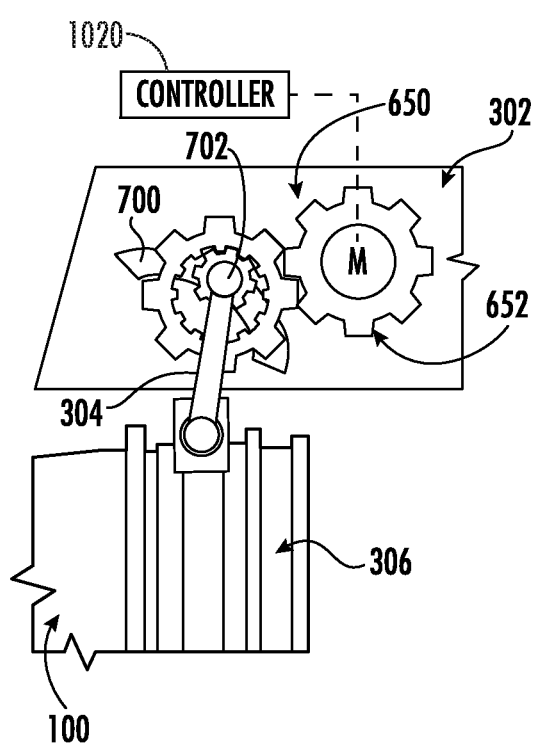
FIGS. 8A and 8B respectively show further rotary actuators.
Figure 8B:
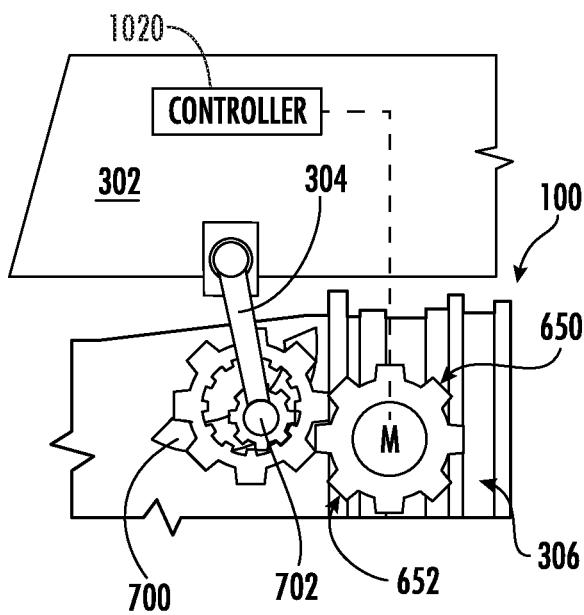

Now referring to FIGS. 7A and 7B, and 8A and 8B, in other embodiments, engine-mounting linkage system 300 may include an engine-mounting link 304 connected to a channel 700 that allows the engine mounting link 304 to pivot when actuated by the actuator. A channel 700 may be defined by the engine support structure 302 (FIGS. 7A and 8A) and/or by an engine frame 306 (FIGS. 7B and 8B). The channel 700 may be curved and/or linear, with the curvature of the channel 700 defining a link-articulation pathway for the engine-mounting link 304 connected thereto. By way of example, an engine mounting link 304 may be connected to a channel with a pin 702 or the like configured to fit within the channel 700 and thereby constrain movement of the engine-mounting link 304 to the link-articulation pathway defined by the channel 700. In some embodiments, a link-articulating pathway may allow for the inclination angle θ of an engine-mounting link 304 to be changed without moving the engine 100 relative to the engine support structure 302. For example, a link-articulation pathway may follow a curve having a radius corresponding to a pivot point of the engine-mounting link 304 such that the engine mounting link 304 may rotate about the pivot point without moving the engine 100. In some embodiments, the pin 702 and/or the channel 700 may include bearings, rollers, bushings, or the like (not shown) so as to facilitate movement of the engine mounting link 304.

Figure 9:
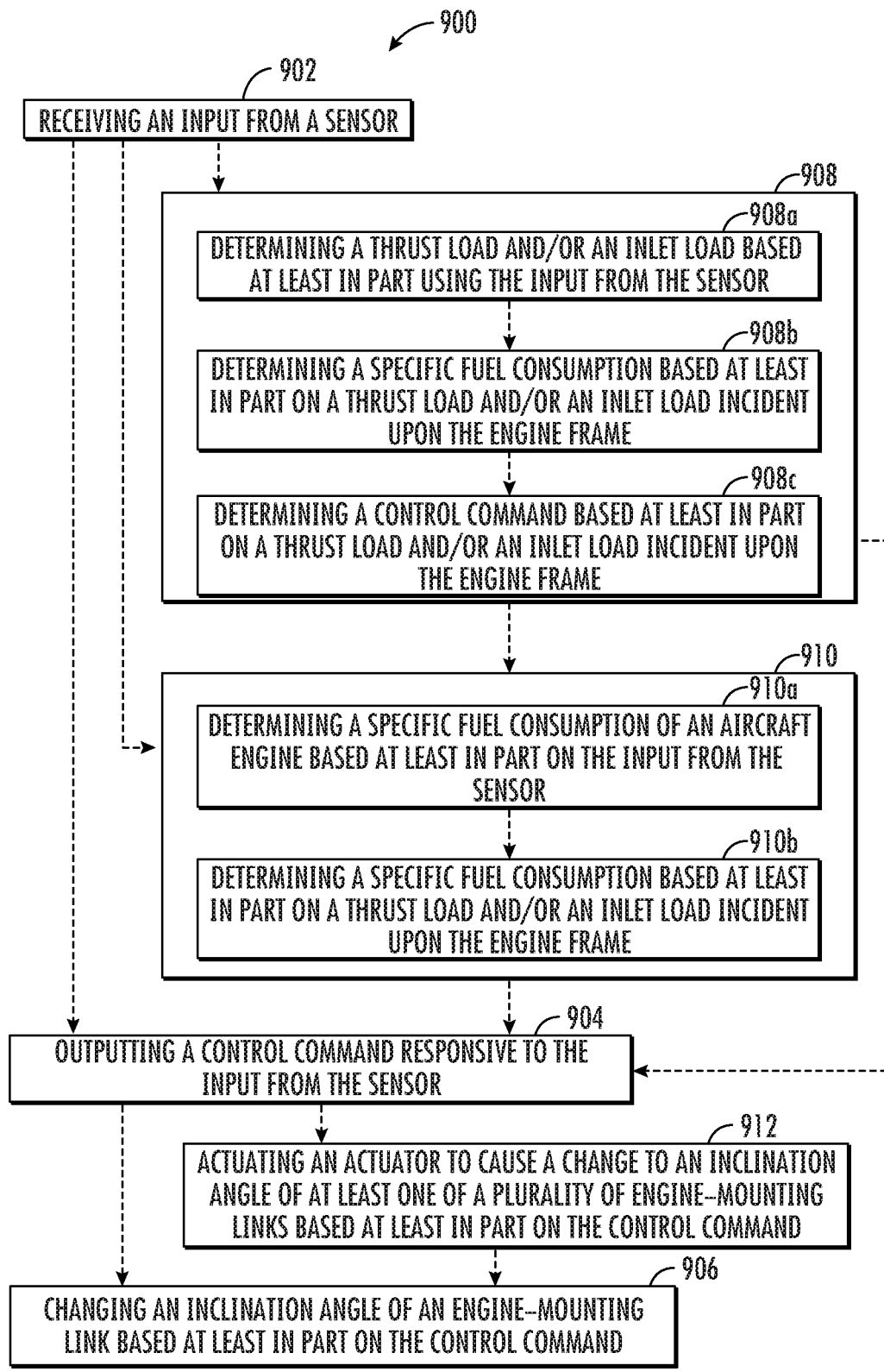
FIG. 9 shows a flowchart depicting an exemplary method of changing an inclination angle of an engine-mounting link.

Now referring to FIG. 9, exemplary methods of changing an inclination angle θ of an engine-mounting link 304 will be described. As shown, an exemplary method 900 may include, at block 902, receiving an input from a sensor 1010. At block 904, an exemplary method 900 may include outputting a control command responsive to the input from the sensor 1010. At block 906, an exemplary method 900 may include changing an inclination angle θ of an engine mounting link based at least in part on the control command. The control command may be operable to actuate an actuator 308 that, when actuated, causes a change to an inclination angle θ of at least one of a plurality of engine-mounting links 304 that connect an engine frame 306 of an aircraft engine 100 to an engine support structure 302 that defines a location for mounting the aircraft engine 100 to an aircraft 10. The plurality of engine-mounting links 304 may include a forward link 320 that is connected to a forward frame portion 310 of the engine frame 306 and the engine support structure 302, and an aft link 322 that is connected to an aft frame portion 312 of the engine frame 306 and the engine support structure 302. The actuator 308 may be connected to the engine support structure 302 and to one of the plurality of engine-mounting links 304, or to the engine support structure 302 and the engine frame 306. For example, an actuator 308 may be connected to the forward link 320 and the engine support structure 302 of the aircraft 10. Additionally, or in the alternative, an actuator 308 may be connected to the forward frame portion 310 of the engine frame 306 and the engine support structure 302 of the aircraft. Further additionally, or in the alternative, an actuator 308 may be connected to the aft link 322 and the engine support structure 302 of the aircraft 302. Further additionally, or in the alternative, an actuator may be connected to the aft frame portion 3112 of the engine frame 306 and the engine support structure 302 of the aircraft 10.

In some embodiments, an exemplary method 900 may include, at block 908, determining a thrust load $F_T$ and/or an inlet load $F_I$ based at least in part the input from the sensor 1010 (block 908a). Additionally, or in the alternative, an exemplary method 900 may include, at block 908, determining a specific fuel consumption based at least in part on a thrust load $F_T$ and/or an inlet load $F_I$ incident upon the engine frame 306 (block 908b). Additionally, or in the alternative, an exemplary method 900 may include, at block 908, determining a control command based at least in part on a thrust load $F_T$ and/or an inlet load $F_I$ incident upon the engine frame 306 (block 908c).

Additionally, or in the alternative, in some embodiments, an exemplary method 900 may include, at block 910, determining a specific fuel consumption of an aircraft engine 100 based at least in part on the input from the sensor 1010 (block 910a). Additionally, or in the alternative, an exemplary method 900 may include, at block 910, determining a control command based at least in part on the specific fuel consumption of the aircraft engine 100 (910b).

The exemplary method 900 may additionally, or alternatively include, at block 912, actuating an actuator to cause a change to an inclination angle θ of at least one of a plurality of engine-mounting links 304 based at least in part on the control command.

Figure 10:
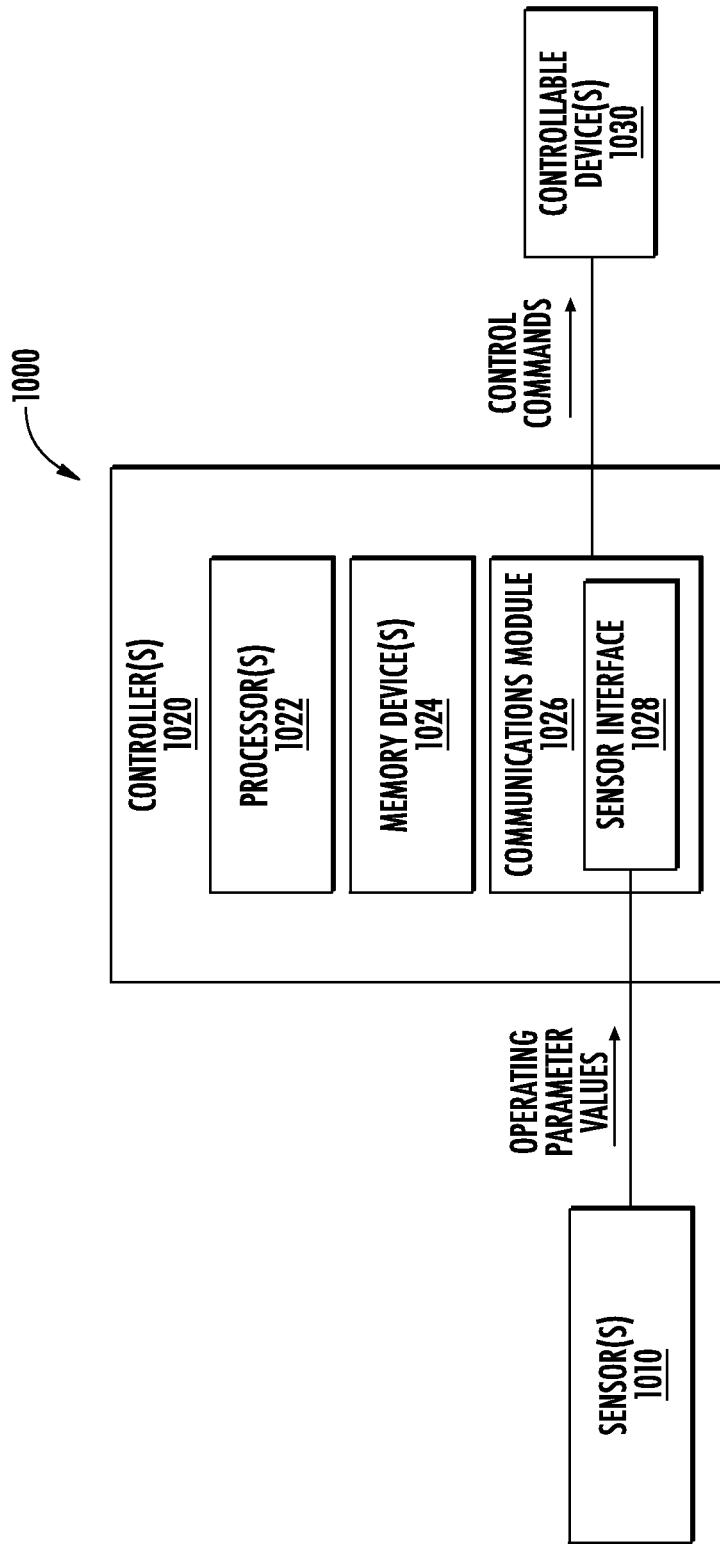
FIG. 10 provides a block diagram of a control system for controlling a variable link of an engine-mounting linkage system according to example embodiments of the present disclosure.

FIG. 10 provides a block diagram of a control system 1000 for controlling a variable link of an engine-mounting linkage system according to example embodiments of the present disclosure. The control system 1000 can include one or more control devices, such as sensors, controllers, processors, controllable devices, etc. that can monitor and control various aspects of an engine-mounting linkage system, such as any of the engine-mounting linkage systems 300 described herein. Particularly, the control system 1000 can control the position (e.g., an inclination angle) of one or more links of an engine-mounting linkage system to achieve a desired output or optimal parameter. For instance, the control system can control the position (e.g., an inclination angle) of one or more links of an engine-mounting linkage system to minimize specific fuel consumption, minimize strain on the backbone of the engine, some combination thereof, etc. The control system 1000 can be configured to control an engine-mounting linkage system for mounting an aircraft engine to an engine support structure (e.g., a pylon on a wing) of an aircraft. However, the control system 1000 can be configured to control an engine-mounting linkage system for mounting an engine to other types of vehicles or static structures as well.

During operation of an engine, the control system 1000 can monitor one or more operating parameters using one or more sensors 1010, calculating parameters based at least in part on the received sensor outputs, and/or using one or more models. Example operating parameters that can be sensed, calculated, and/or modeled include an ambient temperature, an exhaust gas temperature, a compressor discharge temperature, an inlet low pressure compressor temperature, a specific fuel consumption, an engine efficiency, an angle of attack of the aircraft to which the engine is mounted, an angle of attack of an aircraft to which the engine is mounted, a Mach number, a thrust, an airspeed, a fan flow, a core flow, a current actuator setting or position, a fan speed, a core speed, an engine inlet pressure, a bypass passage pressure, an inlet high pressure compressor pressure, a compressor discharge pressure, a high pressure turbine pressure, an accelerometer measurement, a flight control position, and/or one or more waypoints of a mission (e.g., the origin, the destination, and one or more points therebetween).

The control system 1000 includes one or more controllers 1020. In some embodiments, the one or more controllers 1020 can be engine controllers. Particularly, the one or more controllers 1020 can be, for example, Electronic Engine Controllers (EEC) or Electronic Control Units (ECU). Further, in some embodiments, the one or more engine controllers 1020 can be incorporated into a Full Authority Digital Engine Control (FADEC) system of a vehicle, such as an aircraft. In some embodiments, the one or more controllers 1020 are configured to be dedicated to controlling operation of an engine-mounting linkage system. In other embodiments, such as in embodiments in which the one or more controllers 1020 are engine controllers for an aircraft gas turbine engine, the one or more controllers 1020 are configured to control operation of an engine-mounting linkage system, among other potential systems. In some embodiments, the one or more controllers 1020 can be a system of controllers or a single controller. In yet other embodiments, the one or more controllers 1020 can some other computing devices onboard the vehicle to which the engine is mounted.

As shown in FIG. 10, the controllers 1020 can include one or more processor(s) 1022 and associated memory device(s) 1024 configured to perform a variety of computer-implemented functions and/or instructions (e.g., performing the methods, steps, calculations and the like and storing relevant data as disclosed herein). The instructions, when executed by the one or more processors, can cause the one or more processor(s) 1022 to perform operations, including determining and providing control commands to various controllable devices 1030 of the engine-mounting linkage system.

Additionally, the controllers 1020 can also include a communications module 1026 to facilitate communications between the one or more controllers 1020 and various components of the engine-mounting linkage system. Further, the communications module 1026 can include a sensor interface 1028 (e.g., one or more analog-to-digital converters) to permit signals transmitted from the one or more sensors 1010 to be converted into signals that can be understood and processed by the one or more processor(s) 1022. It should be appreciated that the sensors 1020 can be communicatively coupled to the communications module 1026 using any suitable means. For example, the sensors 1010 can be coupled to the sensor interface 1028 via a wired connection. However, in other embodiments, the sensors 1010 may be coupled to the sensor interface 1028 via a wireless connection, such as by using any suitable wireless communications protocol. As such, the processor(s) 1022 can be configured to receive one or more signals or outputs from the sensors 1010, such as one or more of the operating parameters noted above.

As used herein, the term "processor" refers not only to integrated circuits referred to in the art as being included in a computing device, but also refers to a controller, a microcontroller, a microcomputer, a programmable logic controller (PLC), an application specific integrated circuit, and other programmable circuits. The one or more processors can also be configured to complete the required computations needed to execute advanced algorithms. Additionally, the memory device(s) 1024 can generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 1024 can generally be configured to store suitable computer-readable instructions that, when implemented by the processor(s) 1022, configure the controllers 1020 to perform the various functions described herein.

As further shown in FIG. 10, the control system 1000 also includes one or more controllable devices 1030. The controllable devices 1030 are communicatively coupled with the one or more controllers 1020, e.g., via suitable wire or wireless communication links. The controllable devices 1030 of the engine-mounting linkage system include any device communicatively coupled with the one or more controllers 1020 that, when commanded by the one or more controllers 1020, can cause a change in position (e.g., an inclination angle) of one of the links of the engine-mounting linkage system. One example controllable device 1030 includes an actuator operably couplable with one of the links of the engine-mounting linkage system. The actuator is operable to change an inclination angle of the link to which the actuator is connected.

The control system 1000 is configured to control an engine-mounting linkage system, as noted above. Particularly, the control system 1000 is configured to control a position of a link configured to operably couple an engine to an engine mounting structure of a vehicle. For instance, the variable position link can be the forward link 320 of FIGS. 3A and 3B, the aft link 322 of FIGS. 4A and 4B, etc. Further, as noted, the control system 1000 includes one or more sensors 1010, an actuator 308 operably couplable with the link 304, and one or more controllers 1020 communicatively coupled with the one or more sensors 1010 and the actuator 308. The one or more controllers 1020 have one or more memory devices 1024 and one or more processing devices 1022, the one or more memory devices 1024 storing computer-readable instructions that can be executed by the one or more processing devices 1022 to perform operations. In some embodiments, in performing the operations, the one or more processing devices 1022 are configured to determine a control command based at least in part on an output received from the one or more sensors 1020 and cause the actuator 308 to change the position (e.g., the inclination angle) of the link 304 based at least in part on the determined control command. By changing the position of the link 304, advantageously, the link of the engine-mounting linkage system can be positioned in an optimal position for various operating conditions of the engine, and thus, engine bending can be controlled. Consequently, better specific fuel consumption, operability, and deterioration characteristics can be achieved, e.g., compared to conventional fixed-link engine-mounting systems.

Figure 11:
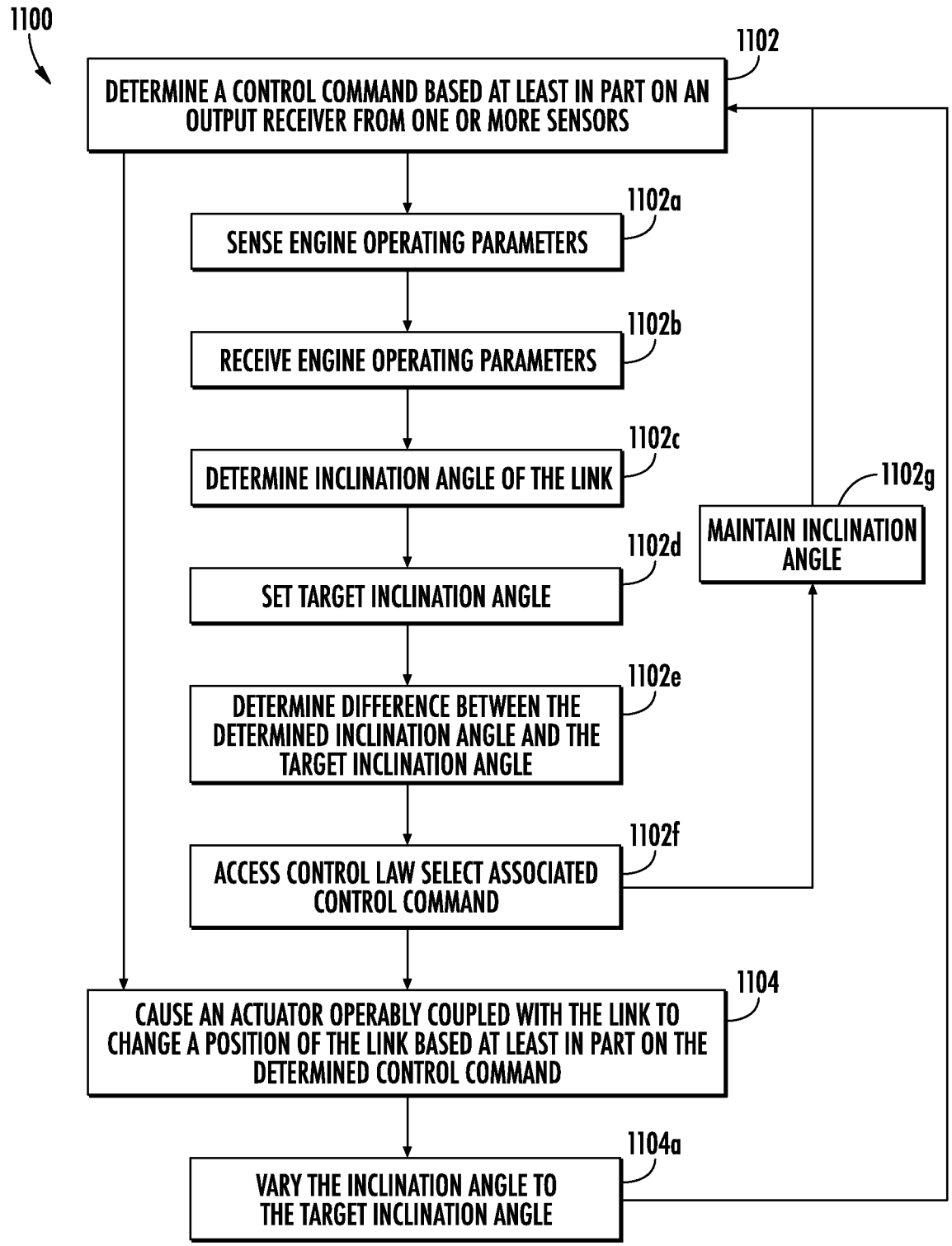
FIG. 11 provides a flow diagram of one example manner in which the control system is configured to control a position of a link configured to operably couple an engine to an engine mounting structure of a vehicle.

FIG. 11 provides a flow diagram of a method (1100) in which the control system 1000 can control a position of a link configured to operably couple an engine to an engine mounting structure of a vehicle. For instance, the method (1100) can be implemented to control any of the engine-mounting systems described herein. Some or all of the method (1100) can be implemented by the control system 1000 described herein. The method (1100) is a suitable method for controlling the position of a link at any operation phase of the engine, including takeoff, climb, cruise, and descent. In addition, it will be appreciated that exemplary method (1100) can be modified, adapted, expanded, rearranged and/or omitted in various ways without deviating from the scope of the present subject matter. Reference numerals utilized above to denote certain features will be utilized below to provide context to method (1100).

At (1102), the method (1100) includes determining a control command based at least in part on an output received from one or more sensors. For instance, the one or more controllers 1020 can determine the control command based at least in part on an output received from one or more sensors 1010. An example manner in which the one or more controllers 1020 can determine the control command based at least in part on an output received from one or more sensors 1010 is provided below.

At (1102*a*), the method (1100) includes sensing one or more operating parameters. For instance, the one or more sensors 1010 can be any suitable type of sensor, including without limitation, strain gages, e.g., for sensing strain on a backbone of the engine, thermocouples, e.g., for sensing temperature at various stations of the engine, pressure sensors, e.g., for sensing the pressure at various stations of the engine, optical position sensors, e.g., for sensing a position or inclination angle of the link, the position of the actuator arm, some other component, etc., and/or clearanceometers, e.g., for sensing the clearance between rotating components and stationary components of the engine. For instance, the clearanceometers can sense the blade tip clearance between the fan blades 136 and the fan casing 146, the turbine blades 166, 170 and their radially outward positioned shrouds, etc.

The sensors 1010 can be mounted to the engine at any suitable location. For example, sensors 1010 can be mounted to the forward and/or aft fan case, booster casings, flanges, and/or internal structures thereof. As another example, sensors 1010 can be mounted to the fan frame and/or front frame casings, flanges, and internal structures thereof, e.g., the outlet guide vanes. As a further example, sensors 1010 can be mounted to the core engine casings, flanges, and internal structures thereof. As yet other examples, sensors 1010 can be mounted to the mid frame casing, flanges, and/or internal structures thereof, the LPT casings, flanges, and/or internal structures thereof, and/or the rear frame casing, flanges, and/or internal structures thereof. In some embodiments, for instance, a strain gage can be mounted to the backbone of the engine.

The one or more sensors 1010 can sense one or more operating parameters. For instance, the operating parameters can include an ambient temperature, a compressor discharge temperature, an inlet low pressure compressor temperature, an angle of attack of the aircraft to which the engine is mounted, an angle of attack of an aircraft to which the engine is mounted, an airspeed, a current actuator setting or position, strain on the backbone of the engine, among other possible operating parameters. The sensors 1010 can sense their respective operating parameters continuously during operation of the engine, at a predetermined interval, etc. Thus, the sensors 1010 can repeatedly sense their respective operating parameters. Signals from the sensors 1010 can be routed to the controllers 1020 for processing.

At (1102*b*), the method (1100) includes receiving the one or more operating parameters. For instance, the one or more controllers 1020 can receive the one or more operating parameters sensed at (1102*a*). In some instances, the one or more controllers 1020 can receive calculated operating parameters. For instance, the one or more operating parameters sensed at (1102*a*) can be utilized to calculate or model other operating parameters, such as specific fuel consumption, engine efficiency, exhaust gas temperature, etc. Accordingly, the one or more controllers 1020 can receive one or more sensed, calculated, and/or modeled operating parameters at (1102*b*).

At (1102*c*), the method (1100) includes determining the position of the link based at least in part on the received one or more operating parameters. For instance, in some implementations, the one or more controllers 1020 are configured to determine the position of the link based at least in part on the received one or more operating parameters. Particularly, in some implementations, the one or more controllers 1020 can determine the inclination angle of the link based at least in part on the received one or more operating parameters. As noted above, the output received from the one or more sensors 1010 can include one or more operating parameters. Specifically, the output received from the one or more sensors 1010 can include one or more operating parameters indicative of the position (e.g., inclination angle) of the link. By receiving the one or more operating parameters indicative of the position (e.g., inclination angle) of the link, the current position of the link can be determined by the one or more controllers 1020.

Any suitable operating parameters can be utilized by the one or more controllers 1020 to determine the position of the link. For instance, an operating parameter associated with the actuator setting or position can be utilized to determine the position of the link. For example, the operating parameter can correspond to the axial or linear position of the actuator arm 604 of the actuator 308 operably coupled with the variable link 304. As another example, an optical position sensor can be utilized to detect or sense the present position of the variable link 304. The operating parameter can correspond to an inclination angle of the variable link 304.

At (1102d), the method (1100) includes setting a target position of the link based at least in part on the received one or more operating parameters. For instance, in some implementations, the one or more controllers 1020 are configured to determine the target position of the link based at least in part on the received one or more operating parameters. Particularly, in some implementations, the one or more controllers 1020 can set a target inclination angle based at least in part on the received one or more operating parameters. That is, the one or more controllers 1020 can set a target position or setpoint based at least in part on received sensed, calculated, and/or modeled operating parameters. The received sensed, calculated, and/or modeled operating parameters used by the one or more controllers 1020 can be indicative of operating conditions of the engine. In this way, the target position (e.g., target inclination angle) is set by the one or more controllers 1020 based at least in part on the current operating conditions of the engine. Example operating parameters indicative of operating conditions of the engine include an ambient temperature, an exhaust gas temperature, a compressor discharge temperature, an inlet low pressure compressor temperature, a specific fuel consumption, an engine efficiency, an angle of attack of the aircraft to which the engine is mounted, an angle of attack of the engine, a Mach number, a thrust, an airspeed, a fan flow, a core flow, a fan speed, a core speed, an engine inlet pressure, a bypass passage pressure, an inlet high pressure compressor pressure, a compressor discharge pressure, a high pressure turbine pressure, an accelerometer measurement, a flight control position, and/or one or more waypoints of a mission (e.g., the origin, the destination, and one or more points therebetween).

In some implementations, the target position of the link is set by the one or more controllers 1020 based at least in part on at least two operating parameters indicative of the operating conditions of the engine. For instance, the target position (e.g., target inclination angle) can be set based at least in part on the angle of attack of the engine and the compressor discharge pressure. It will be appreciated however that the target position of the link can be set by the one or more controllers 1020 based at least in part on less than two operating parameters and more than two operating parameters. Furthermore, the one or more controllers 1020 can set the target position continuously based on one or more operating parameters, at predetermined intervals, and/or upon a trigger condition, e.g., when a particular predetermined operating parameter exceeds a predetermined threshold.

At (1102e), once the position of the link is determined at (1102c) and the target position of the link is set at (1102d), the method (1100) includes determining a difference or error between the position of the link and the target position. For instance, the one or more controllers 1020 can determine a difference between the position of the link and the target position. In some implementations, the one or more controllers 1020 can determine a difference between a determined inclination angle of the link and the set target inclination angle. The control command is determined based at least in part on the difference between the determined inclination angle and the target inclination angle.

At (1102f), the method (1100) includes accessing a control law that corresponds a plurality of differences with a plurality of control commands and selecting the control command associated with the determined difference. For instance, after determining the difference at (1102e), the one or more controllers 1020 can access the control law and select the control command associated with the difference determined at (1102e). After the one or more controllers 1020 select the control command associated with the determined difference, the one or more controllers 1020 can provide the selected control command to a controllable device, such as the actuator 308.

Figures 12, 13:
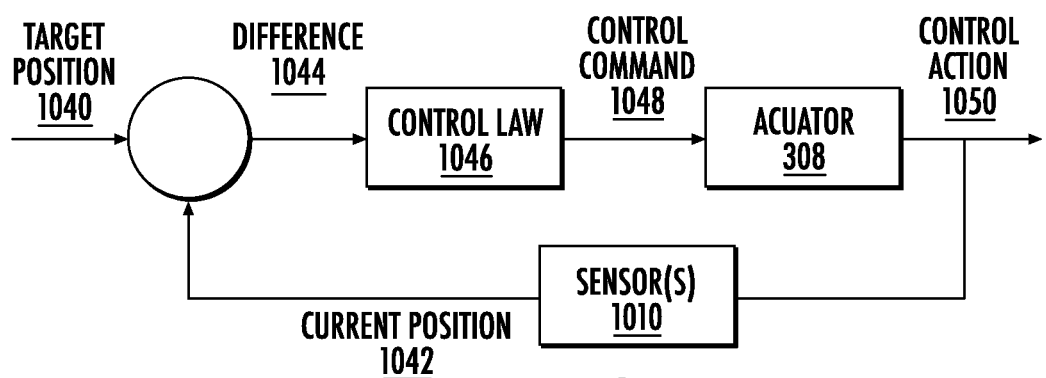
FIG. 12 provides a table of an example control law that associates various differences with various control commands according to example embodiments of the present disclosure.
FIG. 13 provides an example feedback control loop according to example embodiments of the present disclosure.

FIG. 12 provides a table of an example control law that associates various differences with various control commands. The control law can be stored in one or more of the memory devices 1024 of the one or more controllers 1020, for example. The control law can be accessed by the one or more processors 1024. As noted, the control law associates or corresponds various differences with various control commands. Particularly, as depicted, a difference A corresponds to or is associated with a control command D. For instance, if the difference between the target position and the determined position of the link 304 yields an error or difference A, the control command D associated with the difference A is selected as the control command. The control command D, when provided to a controllable device, such as the actuator arm 604 of the actuator 308, can cause the controllable device to perform a control action, e.g., such that the position of the variable link 304 is changed. More specifically, the control command D, when provided to the actuator 308, can cause the actuator 308 to adjust or change the position of the inclination angle of the link 304 such that the difference between the target position and the determined current position of the link 304 is driven toward zero (0). In this way, the position of the link is varied to the target position. As further shown in FIG. 12, a difference B corresponds to or is associated with a control command E, a difference C corresponds to or is associated with a control command F, and so on as the $N_D$th difference corresponds with the $N_C$th control command. In some embodiments, the determined difference and the control command can be associated with one another in a one-to-one relationship. In other embodiments, the determined difference and the control command can be associated with one another based at least in part on a mathematical relationship, such as via derivatives or integrals.

Returning to FIG. 11, as noted above, after the one or more controllers 1020 select the control command associated with the determined difference, the one or more controllers 1020 can provide the selected control command to a controllable device, such as the actuator 308. In some instances, the current position of the link is at or within a predetermined range of the target position, and consequently, the one or more controllers 1020 cause the variable link 304 to maintain its current position. For example, if the current inclination angle of the link 304 is within a predetermined range of the target inclination angle, the current inclination angle is positioned at the target inclination angle to a satisfactory degree, e.g., within one degree (1°) of the target inclination angle. Accordingly, the one or more controllers 1020 cause the actuator 308 to maintain the position of the variable link 304. That is, the selected control command provided to the actuator 308 causes the actuator 308 to maintain the current position of the variable link 304, and consequently, the method (1100) proceeds to (1102g) and then reverts to (1102). The method (1100) then repeats or begins once again. On the other hand, if the current inclination angle of the link 304 is not within the predetermined range of the target inclination angle, the current inclination angle is not positioned at the target inclination angle to a satisfactory degree. The selected control command will reflect that the current inclination angle of the link is not at the target inclination angle and the method (1100) proceeds to (1104).

At (1104), the method (1100) includes causing an actuator operably coupled with the link to change a position of the link based at least in part on the determined control command. In some implementations, causing the actuator operably coupled with the link to change the position of the link based at least in part on the determined control command at (1104) includes causing the actuator operably coupled with the link to change an inclination angle of the link based at least in part on the determined control command. For instance, the one or more controllers 1020 can cause the actuator 308 to change the inclination angle of the link 304 from the angle of the link 304 shown in FIG. 3A to the angle of the link 304 shown in FIG. 3B, or vice versa.

At (1104a), the method (1100) includes varying the inclination angle to the target inclination angle. Accordingly, in such implementations, in causing the actuator operably coupled with the link to change the inclination angle of the link based at least in part on the determined control command at (1104a), the inclination angle is adjusted to the target inclination angle. By varying the inclination angle of the link 304 to the target inclination angle, the link of the engine-mounting linkage system 300 can be positioned in an optimal position for the actual operating conditions of the engine thereby providing a number of advantages and benefits described above.

FIG. 13 provides an example control loop for controlling the position of the variable link 304 in accordance with an embodiment of the present disclosure. Particularly, FIG. 13 summarizes the method (1100) of FIG. 11. As shown, a target position 1040 (e.g., a target inclination angle) is input into a summation block. For instance, the target position 1040 input into the summation block can be the target position 1040 set at (1102d) of method (1100). As noted above, the target position 1040 can be set based at least in part on one or more sensed/calculated/modeled operating parameters. As further depicted, a current position 1042 of the link 304 determined based at least in part on one or more sensed/calculated/modeled operating parameters indicative of the position of the link 304 are input into the summation block as well.

The target position 1040 (e.g., target inclination angle) and the current position 1042 (e.g., the current inclination angle of the link 304) are input into the summation block and the one or more controllers 1020 then determine the error or difference 1044 therebetween. The one or more controllers 1020 can then make an adjustment to drive the difference 1044 toward zero (0). For instance, the one or more controllers 1020 can access the control law 1046 of FIG. 12, and can select a control command 1048 that corresponds or is associated with the determined difference 1044. The control command 1048, when provided to the actuator 308, can cause the actuator 308 to perform a control action 1050, e.g., to execute the control command 1044. For instance, the control command 1048, when provided to the actuator 308, can cause the actuator 308 to change the position of the link 304 and/or maintain the position of the link 304 depending on the determined control command 1048. In this way, ultimately, the link 304 positioned or maintained in an optimal position based the operating conditions of the engine, and consequently, a number of advantages and benefits can be realized.

Figure 14:
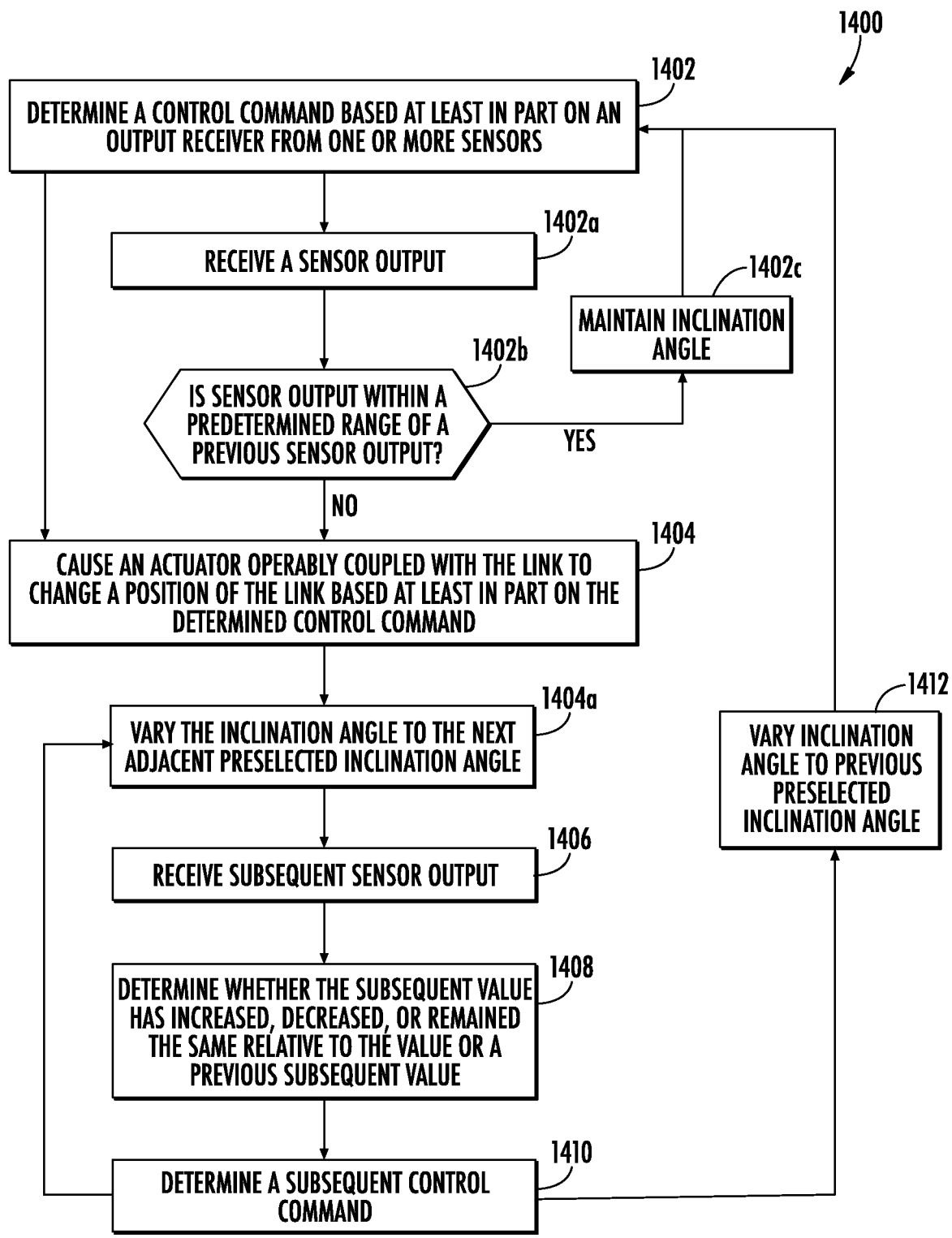
FIG. 14 provides a flow diagram of another example manner in which the control system is configured to control a position of a link configured to operably couple an engine to an engine mounting structure of a vehicle.

FIG. 14 provides a flow diagram of a method (1400) in which the control system 1000 can control a position of a link configured to operably couple an engine to an engine mounting structure of a vehicle. For instance, the method (1400) can be implemented to control any of the engine-mounting systems described herein. Some or all of the method (1400) can be implemented by the control system 1000 described herein. The method (1400) is a suitable method for controlling the position of a link at any operation phase of the engine, including takeoff, climb, cruise, and descent. In addition, the exemplary method (1400) can be modified, adapted, expanded, rearranged and/or omitted in various ways without deviating from the scope of the present subject matter. Reference numerals utilized above to denote certain features will be utilized below to provide context to method (1400).

At (1402), the method (1400) includes determining a control command based at least in part on an output received from one or more sensors. For instance, the one or more controllers 1020 can determine the control command based at least in part on an output received from the one or more sensors 1010. An example manner in which the one or more controllers 1020 can determine the control command based at least in part on an output received from one or more sensors 1010 is provided below.

At (1402a), the method (1400) includes receiving, from the one or more sensors, the output, the output being indicative of a value of an operating parameter. For instance, the one or more controllers 1020 can receive the output from the one or more sensors 1010, such as any of the sensors noted herein. The output can be indicative of a value for an operating parameter associated with the engine, such as any of the operating parameters noted herein. As one example, the one or more controllers 1020 can receive, from a strain gage sensor, an output indicative of a value associated with an amount of strain on a backbone of the engine. The one or more controllers 1020 can receive sensor outputs indicative of values for other operating parameters as well, such as the temperature or pressure at a station of the engine, among others.

At (1402b), the method (1400) includes determining whether the value is within a predetermined range of a previous value of the operating parameter, the previous value of the operating parameter being received as part of a previous output received from the one or more sensors. For instance, the one or more controllers 1020 can determine whether the value is within the predetermined range of the previous value of the operating parameter received as part of a previous output received from the one or more sensors, e.g., at a previous time step. The control command is determined by the one or more controllers 1020 in response to whether the received value (e.g., the present value) is within the predetermined range of the previous value.

On one hand, as depicted in FIG. 14, if the received value (e.g., the present value) is within a predetermined range of the previous value as determined at (1402b), the control command determined by the one or more controllers 1020 causes the actuator 308 to maintain the current position of the link 304 (e.g., maintain the current inclination angle of the link 304). As one example, the determined control command can be provided to the actuator 308, and based on the control command, the actuator 308 can maintain the current position of the link 304, e.g., by maintaining the axial or linear position of the actuator arm 604. As another example, the determined control command can be discarded by the one or more controllers 1020, e.g., if the actuator 308 is configured to maintain the current position of the link 304 until instructed otherwise. Accordingly, if the received value is within a predetermined range of the previous value as determined at (1402*b*), the method (1400) proceeds to (1402*c*). On the other hand, if the received value is not within the predetermined range of the previous value as determined at (1402*b*), the method (1400) proceeds to (1404).

At (1404), the method (1400) includes causing an actuator operably coupled with the link to change a position of the link based at least in part on the determined control command. In some implementations, causing the actuator operably coupled with the link to change the position of the link based at least in part on the determined control command at (1404) includes causing the actuator operably coupled with the link to change an inclination angle of the link based at least in part on the determined control command. For instance, the one or more controllers 1020 can cause the actuator 308 to change the inclination angle of the link 304 from the angle of the link 304 shown in FIG. 3A to the angle of the link 304 shown in FIG. 3B, or vice versa.

In some implementations, the actuator 308 is operable to change the link 304 to a plurality of preselected positions, such as a plurality of preselected inclination angles. In such implementations, at (1404*a*), in causing the actuator operably coupled with the link to change the inclination angle of the link based at least in part on the determined control command, the one or more controllers cause the actuator to change the inclination angle of the link to a second preselected inclination angle of the plurality of preselected inclination angles. For instance, the second inclination angle can be an adjacent preselected inclination angle to the present inclination angle of the link 304. In some implementations, the second preselected inclination angle can be a predetermined number of inclination angles from the present (and now previous) inclination angle of the link 304, such as a predetermined number of preselected inclination angles that corresponds with a predetermined number of degrees, e.g., two degrees (2°). The one or more controllers 1020 can cause the actuator 308 to increase or decrease the inclination angle of the link 304 to the second preselected inclination angle based at least in part on whether the received value from the one or more sensors 1010 is greater than the upper limit of the predetermined range or below the minimum limit of the predetermined range of the previous value received as part of the previous sensor output.

At (1406), the method (1400) includes receiving, from the one or more sensors, a subsequent output, the subsequent output being indicative of a subsequent value of the operating parameter. For instance, after the actuator 308 changes the position of the link 304 (e.g., the inclination angle) based at least in part on the determined control command at (1404), the one or more controllers 1020 can receive, from the one or more sensors 1010, the subsequent output indicative of the subsequent value of the operating parameter. The subsequent output can be indicative of a value for the same operating parameter as the output received at (1402*a*). For instance, the value received at (1402*a*) can be indicative of an amount of strain on the backbone of the engine, and likewise, the value received at (1406) can be indicative of the amount of strain on the backbone of the engine. Of course, the values received at (1402*a*) and (1406) can be the same or different.

At (1408), the method (1400) includes determining whether the subsequent value has increased, decreased, or remained the same relative to the value or a previous subsequent value. For instance, the one or more controllers 1020 can determine whether the subsequent value received at (1406) has increased, decreased, or remained the same relative to the value received at (1402*a*), or if the method (1400) has looped or repeated more than once through (1404*a*), (1406), and (1408), the one or more controllers 1020 can determine whether the subsequent value received at (1406) has increased, decreased, or remained the same relative to a previous subsequent value received at (1406). By determining whether the subsequent value has increased, decreased, or remained the same relative to the value or a previous subsequent value, the one or more controllers 1020 can determine whether moving the position (e.g., inclination angle) of the link 304 is producing a desired result, e.g., a reduction in strain on the backbone of the engine, which reduces engine bending.

At (1410), the method (1400) includes determining a subsequent control command in response to whether the subsequent value has increased, decreased, or remained the same relative to the value or previous subsequent value. For instance, the one or more controllers 1020 can determine the subsequent control command in response to whether the subsequent value has increased, decreased, or remained the same relative to the value or previous subsequent value.

As depicted in FIG. 14, depending on the control command determined at (1410), the one or more controllers 1020 can provide the determined control command to the actuator 308. In some instances, particularly where the desired result is achieved, the control command, when provided to the actuator 308, can cause the actuator 308 to change the position (e.g., the inclination angle) to a third preselected inclination angle of the plurality of the preselected inclination angles. The third preselected inclination angle can be adjacent the second preselected angle (on a side opposite the initial inclination angle). Thus, the inclination angle can be increased or decreased relative to the inclination angle if the desired result is achieved by moving the position of the link 304. Accordingly, in such implementations, the method (1400) can loop back or revert to (1404*a*) where the inclination angle of the link 304 is moved to another preselected inclination angle. The method (1400) can remain in the (1404*a*), (1406), (1408), (1410) loop until moving the inclination angle does not produce a desired result or produces less of a desired result than the previous inclination angle.

In some other instances, particularly where changing the position of the link 304 at (1404*a*) to another preselected inclination angle does not produce a desired result or produces less of a desired result than the previous inclination angle, the control command, when provided to the actuator 308, can cause the actuator 308 to change the position (e.g., the inclination angle) to a previous preselected inclination angle of the plurality of the preselected inclination angles. In this way, moving the inclination angle produces a more desirable result than the subsequent inclination angle at which the link 304 was previously positioned. Accordingly, in such implementations, the method (1400) proceeds to (1412) to cause the actuator 308 to change the position (e.g., inclination angle) of the link 304 to the prior or previous inclination angle at which the link 304 was positioned.

Further, in some instances, in determining the subsequent control command in response to whether the subsequent value has increased, decreased, or remained the same relative to the value or previous subsequent value at (1410), the one or more controllers 1020 can determine that the subsequent value has remained the same relative to the value or previous subsequent value. In such instances, the subsequent control command can be provided to a computing system (e.g., of a flight management system) of the vehicle 10 to which the engine 100 is mounted. The control command, when provided, can cause the computing system of the vehicle 10 to generate and/or provide a notification indicating a sensor malfunction. Further, the one or more controllers 1020 can set a failure flag indicating a sensor malfunction. Moreover, in some implementations, the subsequent control command can be indicative of instructions for the actuator 308 to move the position of the link 304 to a default position, such as a position that is suitable for all operation phases of a flight envelope.

An example implementation of method (1400) will now be provided. At (1402), the one or more controllers 1020 determine a control command based at least in part on an output received from at least one sensor 1020. To determine the control command, the one or more controllers 1020 receive the output from the sensor 1020 at (1402*a*), the output being indicative of a value of an operating parameter. For this example, the sensor 1020 is one or more strain gages and the value of the operating parameter is indicative of an amount of strain on the backbone of the engine 100. At (1402*b*), the one or more controllers 1020 determine whether the value is within a predetermined range of a previous value of the operating parameter, the previous value of the operating parameter being received as part of a previous output received from the one or more sensors. For this example, the one or more controllers 1020 determine whether the value indicative of the present amount of strain on the engine backbone is within a predetermined range of the previous value indicative of the amount of strain on the engine backbone at a previous time. Accordingly, the one or more controllers 1020 monitor the sensor output for changes. If the value indicative of the present amount of strain on the engine backbone is within the predetermined range of the previous value indicative of the amount of strain on the engine backbone at a previous time, the method (1400) reverts to (1402) and continues monitoring. If, however, the value indicative of the present amount of strain on the engine backbone is not within the predetermined range of the previous value indicative of the amount of strain on the engine backbone at a previous time, the method (1400) proceeds to (1404).

Supposing the value indicative of the present amount of strain on the engine backbone is not within the predetermined range of the previous value indicative of the amount of strain on the engine backbone at a previous time, at (1404), the method (1400) includes causing an actuator 308 operably coupled with the link 304 to change a position of the link 304 based at least in part on the determined control command. For instance, the actuator 308 can change an inclination angle of the link 304. Particularly, the one or more controllers 1020 can cause the actuator 308 to change the inclination angle of the link 304 to a second preselected inclination angle, which is adjacent to the initial or previous inclination angle.

After the inclination angle is changed to the second preselected inclination angle, the one or more controllers 1020 receive a subsequent output at (1406), the subsequent output being indicative of a subsequent value of the operating parameter. Particularly, the subsequent value is indicative of an amount of strain on the engine backbone at a time subsequent to when the sensor output at (1402*a*) was sensed. At (1408), the one or more controllers 1020 determine whether the subsequent value has increased, decreased, or remained the same relative to the value. If the subsequent strain value received at (1406) has increased relative to the strain value received at (1402*a*), the strain has increased due to moving the inclination angle of the link 304, and accordingly, the subsequent control command is determined at (1410) to cause the actuator 308 at (1412) to revert to the previous inclination angle, e.g., to reduce the strain on the backbone.

If, however, the subsequent strain value received at (1406) has decreased relative to the strain value received at (1402*a*), the strain has decreased due to moving the inclination angle of the link 304, and accordingly, the subsequent control command is determined at (1410) to cause the actuator 308 at (1404*a*) to move the link 304 to another inclination angle, e.g., an adjacent preselected inclination angle that is opposite the rotational direction of the initial inclination angle. In this way, the one or more controllers 1020 can continue attempting to reduce the strain on the backbone, or produce a more desirable result, which in this example is less strain on the engine backbone. The method (1400) proceeds through the (1404*a*), (1406), (1408), (1410) loop until moving the inclination angle does not result in less strain on the engine backbone. At such an inclination angle, the method (1400) proceeds to (1412) such that the inclination angle that corresponds with the least amount of strain on the engine backbone is selected. In this way, engine bending can be minimized.

Figure 15:
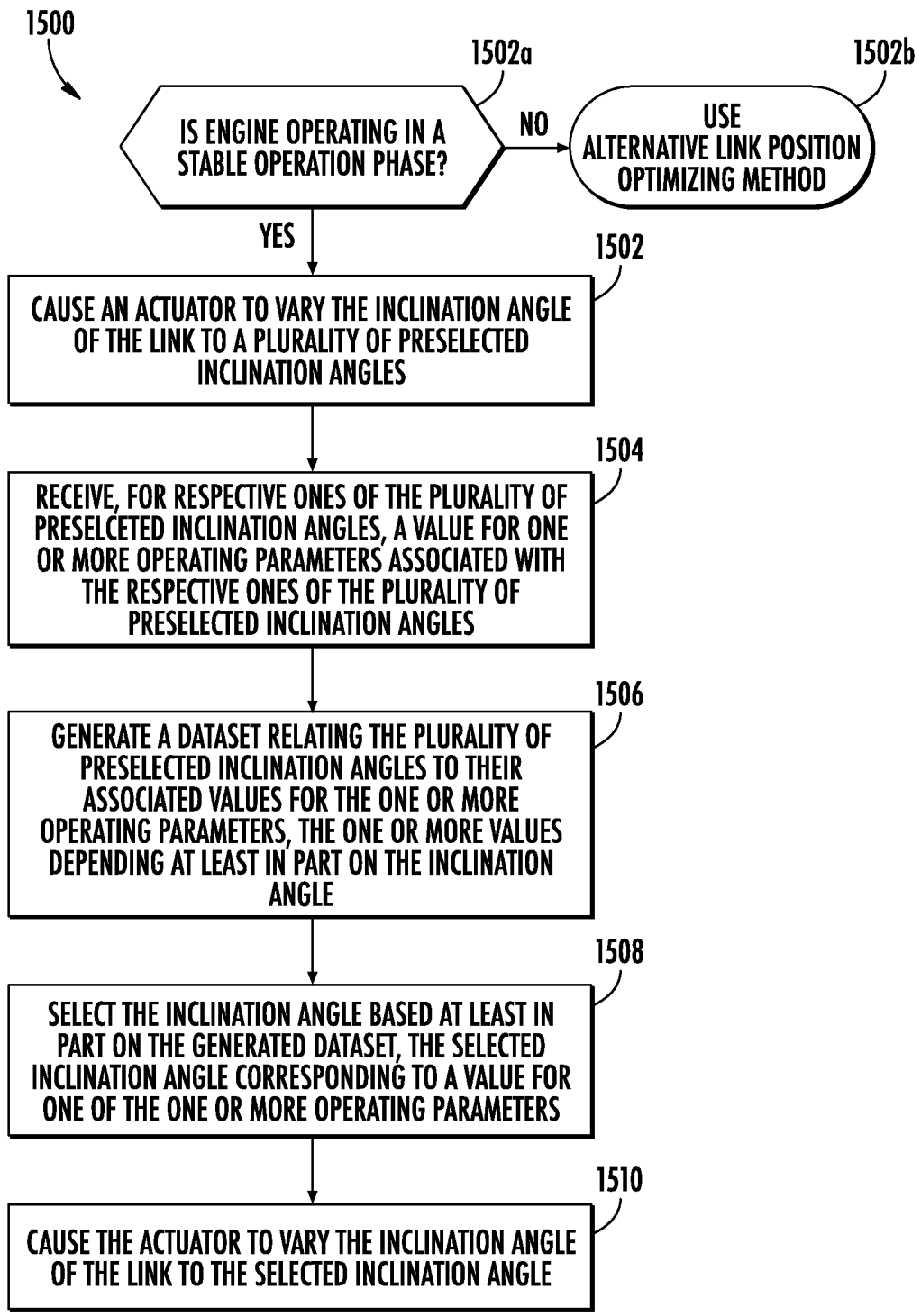
FIG. 15 provides a flow diagram of yet another example manner in which the control system is configured to control a position of a link configured to operably couple an engine to an engine mounting structure of a vehicle.

FIG. 15 provides a flow diagram of yet another example method (1500) in which the control system 1000 is configured to control a position of a link configured to operably couple an engine to an engine mounting structure of a vehicle. For instance, the method (1500) can be implemented to control any of the engine-mounting systems described herein. Some or all of the method (1500) can be implemented by the control system 1000 described herein. The method (1500) is a suitable method for controlling the position of a link at any operation phase of the engine, but particularly during stable operation phases. For instance, in implementations in which the engine is an aircraft gas turbine engine, the method (1500) is particular suitable for stable operation phases such as climb, cruise, and descent. In addition, the exemplary method (1500) can be modified, adapted, expanded, rearranged and/or omitted in various ways without deviating from the scope of the present subject matter. Reference numerals utilized above to denote certain features will be utilized below to provide context to method (1500).

At (1502), the method (1500) includes causing an actuator operably couplable with a link configured to operably couple an engine with an engine mounting structure to vary an inclination angle of the link to a plurality of preselected inclination angles. For instance, the one or more controllers 1020 can cause the actuator 308 to vary or move the inclination angle of the link 304 to a plurality of preselected inclination angles. As one example, the one or more controllers 1020 can cause the actuator 308 to move the inclination angle of the link 304 through an operational range of preselected inclination angles. The operational range can span from a maximum inclination angle to a minimum inclination angle, for instance. The one or more controllers 1020 can cause the actuator 308 to move the inclination angle of the link 304 to a first inclination angle $\theta_1$, a second inclination angle $\theta_2$, a third inclination angle $\theta_3$, and so on to the Nth inclination angle $\theta_N$, wherein N is an integer.

In some other implementations, the preselected inclination angles can be spaced from one another, e.g., by one or more preselected inclination angles. For example, the first inclination angle $\theta_1$ can correspond to the minimum inclination angle, the second inclination angle $\theta_2$ can correspond to a midpoint inclination angle that is spaced from the minimum inclination angle by one or more preselected inclination angles and positioned midway between the minimum inclination angle and the maximum inclination angle, and the third inclination angle $\theta_3$ can correspond to the maximum inclination angle, which is spaced from the second inclination angle $\theta_2$ by one or more preselected inclination angles. In some other implementations, the preselected inclination angles can be adjacent one another. Accordingly, the actuator 308 moves the link 304 from one inclination angle to the next adjacent inclination angle.

At (1504), the method (1500) includes receiving, for respective ones of the plurality of preselected inclination angles, a value for one or more operating parameters associated with the respective ones of the plurality of preselected inclination angles. For instance, the one or more controllers 1020 can receive an operating parameter value for each inclination angle to which the link 304 is varied or moved to by the actuator 308. The received values can be sensed, calculated, and/or modeled values. As one example, the values can be sensed temperature values indicative of a temperature at a station of the engine. As another example, the values can be sensed pressure values indicative of a pressure at a station of the engine. As a further example, the values can be a calculated specific fuel consumption or efficiency of the engine. As yet another example, the values can be sensed values indicative of an amount of strain on the backbone of the engine.

At (1506), the method (1500) includes generating a dataset relating the plurality of preselected inclination angles to their associated values for the one or more operating parameters, the one or more values depending at least in part on the inclination angle. For instance, the one or more controllers 1020 can generate the dataset. An example dataset generated by the one or more controllers 1020 is provided below.

Figures 16, 17:
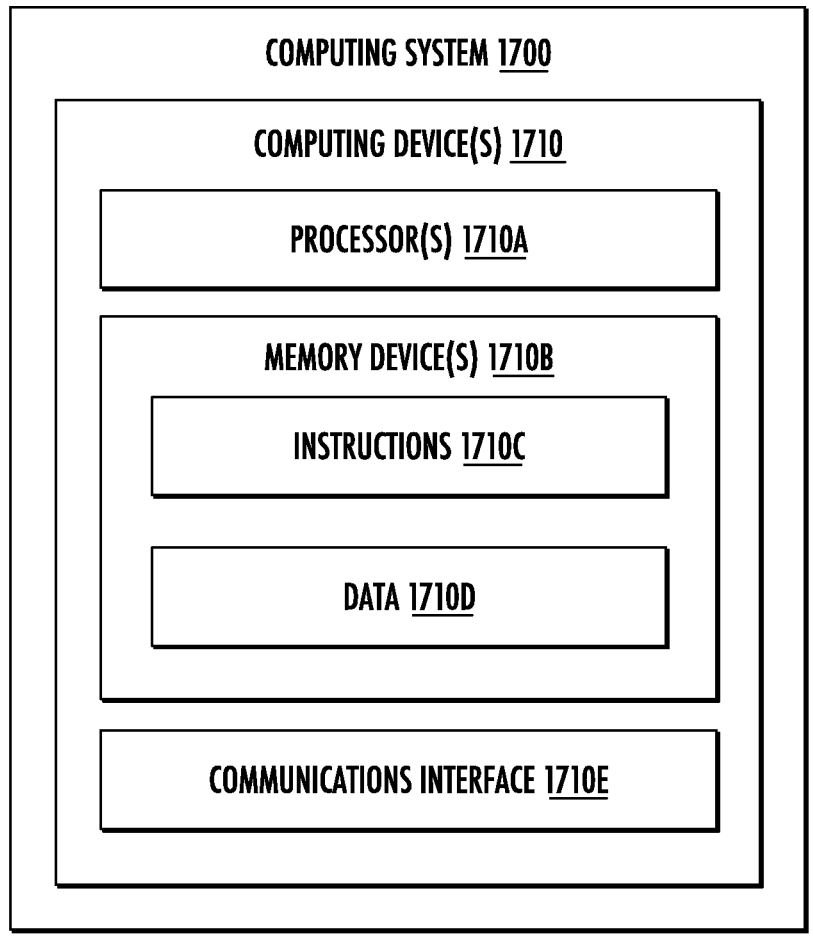
FIG. 16 provides a generated dataset according to example embodiments of the present disclosure.
FIG. 17 provides an example computing system in accordance with an example embodiment of the present disclosure.

FIG. 16 provides a generated dataset according to example embodiments of the present disclosure. As shown, the dataset relates the plurality of preselected inclination angles to their associated values. For this example, the values are indicative of the specific fuel consumption of the engine when the link 304 is positioned at a particular inclination angle. Thus, the calculated specific fuel consumption values each depend at least in part on their respective inclination angles. For example, as depicted, the first inclination angle $\theta_1$ is associated with a value indicative of a first specific fuel consumption $SFC_1$. The value indicative of the first specific fuel consumption $SFC_1$ can be calculated based on a parameter sensed when the link 304 is positioned at the first inclination angle $\theta_1$. Similarly, the second inclination angle $\theta_2$ is associated with a value indicative of a second specific fuel consumption $SFC_2$. The value indicative of the second specific fuel consumption $SFC_2$ can be calculated based on a parameter sensed when the link 304 is positioned at the second inclination angle $\theta_2$. Likewise, the third inclination angle $\theta_3$ is associated with a value indicative of a third specific fuel consumption $SFC_3$. The value indicative of the third specific fuel consumption $SFC_3$ can be calculated based on a parameter sensed when the link 304 is positioned at the third inclination angle $\theta_3$. The same is true for each associated preselected inclination angle and associated value indicative of specific fuel consumption.

At (1508), returning to FIG. 15, the method (1500) includes selecting the inclination angle based at least in part on the generated dataset, the selected inclination angle corresponding to a value for one of the one or more operating parameters. In some implementations, the inclination angle that optimizes one or more particular operating parameters is selected.

For instance, as one example, the value for the one or more operating parameters received for the respective ones of the plurality of preselected inclination angles is a specific fuel consumption of the engine, e.g., as shown in FIG. 16. In such implementations, the inclination angle that optimizes the specific fuel consumption is selected. Particularly, to optimize the specific fuel consumption, the selected inclination angle corresponds to the value from the dataset that minimizes the specific fuel consumption of the engine. In some implementations, the one or more controllers 1020 select an inclination angle between two preselected inclination angles. For instance, the one or more controllers 1020 can be configured to interpolate or estimate a value that minimizes the specific fuel consumption of the engine based at least in part on at least two known specific fuel consumption values. The inclination angle that corresponds with the estimated value can then be selected as the inclination angle.

As another example, the value for the one or more operating parameters received for the respective ones of the plurality of preselected inclination angles is a strain on a backbone of the engine. In such implementations, the inclination angle that optimizes the strain is selected. Particularly, to optimize the strain on the engine backbone, the selected inclination angle corresponds to the value from the dataset that minimizes the strain on the backbone of the engine. In this way, engine bending can be minimized. In some implementations, the one or more controllers 1020 select an inclination angle between two preselected inclination angles. For instance, the one or more controllers 1020 can be configured to interpolate or estimate a value that minimizes the strain on the engine backbone based at least in part on at least two known strain values. The inclination angle that corresponds with the estimated value can then be selected as the inclination angle.

As a further example, the value for the one or more operating parameters received for the respective ones of the plurality of preselected inclination angles is a temperature or pressure at a station of the engine. In such implementations, the inclination angle that optimizes the temperature or pressure is selected. Particularly, to optimize the temperature or pressure at a station of the engine, the selected inclination angle corresponds to the value from the dataset that minimizes or maximizes the temperature or pressure at a station of the engine. In some implementations, the one or more controllers 1020 select an inclination angle between two preselected inclination angles. For instance, the one or more controllers 1020 can be configured to interpolate or estimate a value that minimizes or maximizes the temperature or pressure at a station of the engine based at least in part on at least two known temperature/pressure values. The inclination angle that corresponds with the estimated value can then be selected as the inclination angle.

At (1510), the method (1500) includes causing the actuator to vary the inclination angle of the link to the selected inclination angle. For instance, the one or more controllers 1020 can cause the actuator 308 to move or vary the inclination angle of the link 304 to the selected inclination angle.

In some implementations, the engine is an aircraft engine and the engine mounting structure is a pylon on a wing of an aircraft. For instance, the engine can be the turbofan 100 of FIGS. 1 and 2 and the aircraft can be the fixed-wing aircraft 10 of FIG. 1. In such implementations of method (1500), prior to or during causing the actuator operably couplable with the link 304 to vary the inclination angle of the link to the plurality of preselected inclination angles at (1502), the one or more controllers 1020 are configured to determine whether the aircraft engine is operating in a stable operation phase at (1502*a*), wherein the stable operation condition includes at least one of climb, cruise, and descent. If the aircraft engine is operating in a stable operation phase, the method (1500) proceeds as set forth above. However, if the aircraft engine is not operating in a stable operation phase, the method (1500) can include not cycling or ceasing cycling the inclination angle to the preselected inclination angles. In this way, particularly during takeoff or other non-stable operation phases, the inclination angle is not moved to an inclination angle that can result in an undesired result, such as causing blade tip rub or significant strain on the engine backbone during takeoff. Furthermore, in such implementations, if the aircraft engine is not operating in a stable operation phase, the one or more controllers 1020 can execute another method for determining the optimal or best angle for the current operating conditions, such as method (1100) of FIG. 11 or method (1400) of FIG. 14. As shown in FIG. 15, the method (1500) can proceed to (1502*b*) to execute an alternative link position optimizing method.

Furthermore, the method (1500) can be repeated at predetermined intervals, upon some trigger condition (e.g., changing operation phases of a flight envelope), upon a predetermined change in a sensor output, etc. In this way, the inclination angle θ can be optimized continuously, at predetermined intervals, or as needed based at least in part on a trigger condition.

FIG. 17 provides an example computing system 1700 according to example embodiments of the present disclosure. The one or more controllers 1020 described herein can include various components and perform various functions of the one or more computing devices of the computing system 1700 described below, for example.

As shown in FIG. 17, the computing system 1700 can include one or more computing device(s) 1710. The computing device(s) 1710 can include one or more processor(s) 1710A and one or more memory device(s) 1710B. The one or more processor(s) 1710A can include any suitable processing device, such as a microprocessor, microcontroller, integrated circuit, logic device, and/or other suitable processing device. The one or more memory device(s) 1710B can include one or more computer-readable media, including but not limited to non-transitory computer-readable media, RAM, ROM, hard drives, flash drives, and/or other memory devices.

The one or more memory device(s) 1710B can store information accessible by the one or more processor(s) 1710A, including computer-readable instructions 1710C that can be executed by the one or more processor(s) 1710A. The instructions 1710C can be any set of instructions that when executed by the one or more processor(s) 1710A, cause the one or more processor(s) 1710A to perform operations. In some embodiments, the instructions 1710C can be executed by the one or more processor(s) 1710A to cause the one or more processor(s) 1710A to perform operations, such as any of the operations and functions for which the computing system 1700 and/or the computing device(s) 1710 are configured, such as operations for controlling an engine-mounting system 300 as described herein. For instance, the methods (1100), (1400), and (1500) can be implemented in whole or in part by the computing system 1700. Accordingly, the methods (1100), (1400), and (1500) can be at least partially computer-implemented methods such that at least some of the steps of the methods (1100), (1400), and (1500) are performed by one or more computing devices, such as the exemplary computing device(s) 1710 of the computing system 1700. The instructions 1710C can be software written in any suitable programming language or can be implemented in hardware. Additionally, and/or alternatively, the instructions 1710C can be executed in logically and/or virtually separate threads on processor(s) 1710A. The memory device(s) 1710B can further store data 1710D that can be accessed by the processor(s) 1710A. For example, the data 1710D can include models, databases, control laws, etc.

The computing device(s) 1710 can also include a network interface 1710E used to communicate, for example, with the other components of system 1700 (e.g., via a network). The network interface 1710E can include any suitable components for interfacing with one or more network(s), including for example, transmitters, receivers, ports, controllers, antennas, and/or other suitable components. One or more external devices, such as remote computing systems or vehicle computing systems, can be configured to receive one or more commands or data from the computing device(s) 1710 or provide one or more commands or data to the computing device(s) 1710.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

Further aspects of the invention are provided by the subject matter of the following clauses:

1. An engine-mounting linkage system, comprising: a plurality of engine mounting links configured to couple an engine frame to an engine support structure of an aircraft, wherein the plurality of engine-mounting links comprises a forward link that is connectable to a forward frame portion of the engine frame and the engine support structure, and an aft link that is connectable to an aft frame portion of the engine frame and the engine support structure; and an actuator that is connectable to the engine support structure and one of the plurality of engine-mounting links, or to the engine support structure and the engine frame, wherein the actuator, when actuated, changes an inclination angle θ of at least one of the plurality of engine-mounting links.

2. The engine-mounting linkage system of any preceding clause, wherein the forward link is connected to the forward frame portion of the engine frame and the engine support structure of an aircraft.

3. The engine-mounting linkage system of any preceding clause, wherein the actuator is connected to the forward link and the engine support structure of the aircraft.

4. The engine-mounting linkage system of any preceding clause, wherein the actuator is connected to the forward frame portion of the engine frame and the engine support structure of the aircraft.

5. The engine-mounting linkage system of any preceding clause, wherein the aft link is connected to the aft frame portion of the engine frame and the engine support structure of an aircraft.

6. The engine-mounting linkage system of any preceding clause, wherein the actuator is connected to the aft link and the engine support structure of the aircraft.

7. The engine-mounting linkage system of any preceding clause, wherein the actuator is connected to the aft frame portion of the engine frame and the engine support structure of the aircraft.

8. The engine-mounting linkage system of any preceding clause, wherein the actuator, when actuated, changes an inclination angle θ of the forward link.

9. The engine-mounting linkage system of any preceding clause, wherein the actuator, when actuated, changes an inclination angle θ of the aft link.

10. The engine-mounting linkage system of any preceding clause, wherein the actuator comprises a linear actuator or a rotary actuator.

11. An engine assembly secured to an aircraft, the engine assembly, comprising: an aircraft engine comprising an engine frame that has a forward frame portion and an aft frame portion; an engine support structure that defines a location for mounting the aircraft engine to an aircraft; a forward link connected to the forward frame portion of the engine frame and to the engine support structure of the aircraft; an aft link connected to the aft frame portion of the engine frame and to the engine support structure of the aircraft; and an actuator connected to: the engine support structure and the forward link, or to the engine support structure and the aft link, or to the engine support structure and the forward frame portion of the engine frame, or to the engine support structure and the aft frame portion of the engine frame; wherein the actuator, when actuated, changes an inclination angle θ of at least one of the forward link and/or the aft link.

12. The engine assembly of any preceding clause, comprising an engine-mounting linkage system of any preceding clause.

13. The engine assembly of any preceding clause, wherein the forward link has an adjustable inclination angle θ, and/or wherein the aft link has an adjustable inclination angle θ.

14. The engine assembly of any preceding clause, wherein the actuator comprises a linear actuator or a rotary actuator.

15. The engine assembly of any preceding clause, comprising: a controller configured to output a control command responsive to an input from a sensor, the control command operable to actuate the actuator.

16. A method of changing an inclination angle θ of an engine-mounting link, the method comprising: receiving an input from a sensor; and outputting a control command responsive to the input from the sensor, the control command operable to actuate an actuator that, when actuated, causes a change to an inclination angle θ of at least one of a plurality of engine-mounting links that connect an engine frame of an aircraft engine to an engine support structure that defines a location for mounting the aircraft engine to an aircraft; wherein the plurality of engine-mounting links comprises a forward link that is connected to a forward frame portion of the engine frame and the engine support structure, and an aft link that is connected to an aft frame portion of the engine frame and the engine support structure; and wherein the actuator is connected to the engine support structure and one of and the plurality of engine-mounting links, or to the engine support structure and the engine frame.

17. The method of any preceding clause, wherein the method is performed using the engine assembly of any preceding clause and/or the engine-mounting linkage system of any preceding clause.

18. The method of any preceding clause, wherein the actuator is connected to the forward link and the engine support structure of the aircraft, or wherein the actuator is connected to the forward frame portion of the engine frame and the engine support structure of the aircraft.

19. The method of any preceding clause, wherein the actuator is connected to the aft link and the engine support structure of the aircraft, or wherein the actuator is connected to the aft frame portion of the engine frame and the engine support structure of the aircraft.

20. The method of any preceding clause, comprising: determining the control command based at least in part on a thrust load $F_T$ and/or an inlet load $F_I$ incident upon the engine frame, the thrust load $F_T$ and/or an inlet load $F_I$ determined based at least in part using the input from the sensor.

21. The method of any preceding clause, comprising: determining a specific fuel consumption of the aircraft engine based at least in part on the input from the sensor, and determining the control command based at least in part on the specific fuel consumption of the aircraft engine.

22. The method of any preceding clause, wherein the change to the inclination angle θ reduces specific fuel consumption of the aircraft engine.

23. A method of controlling a link operably coupling an engine with an engine support structure, the method comprising: determining a control command based at least in part on an output received from one or more sensors; and causing an actuator operably coupled with the link to change a position of the link based at least in part on the determined control command.

24. The method of any preceding clause, wherein causing the actuator operably coupled with the link to change the position of the link based at least in part on the determined control command comprises: causing the actuator operably coupled with the link to change an inclination angle of the link based at least in part on the determined control command.

25. The method of any preceding clause, wherein the output received from the one or more sensors comprises one or more operating parameters, and wherein determining the control command based at least in part on the output received from the one or more sensors comprises: determining the inclination angle of the link based at least in part on the received one or more operating parameters; and determining a difference between the determined inclination angle and a target inclination angle, and wherein the control command is determined based at least in part on the difference between the determined inclination angle and the target inclination angle.

26. The method of any preceding clause, further comprising: setting the target inclination angle based at least in part on the received one or more operating parameters.

27. The method of any preceding clause, wherein in causing the actuator operably coupled with the link to change the inclination angle of the link based at least in part on the determined control command, the inclination angle is adjusted to the target inclination angle.

28. The method of any preceding clause, further comprising: receiving, from the one or more sensors, the output, wherein the output is indicative of a value of an operating parameter; and determining whether the value is within a predetermined range of a previous value of the operating parameter, the previous value being received as part of a previous output received from the one or more sensors, and wherein the control command is determined in response to whether the value is within the predetermined range of the previous value.

29. The method of any preceding clause, wherein the actuator is operable to change the link to a plurality of preselected positions, and wherein in causing the actuator operably coupled with the link to change the position of the link based at least in part on the determined control command, the position of the link is adjusted to an adjacent preselected position of the plurality of preselected positions.

30. The method of any preceding clause, further comprising: receiving, from the one or more sensors, a subsequent output, wherein the subsequent output is indicative of a subsequent value of the operating parameter; determining whether the subsequent value has increased, decreased, or remained the same relative to the value; and determining a second control command in response to whether the subsequent value has increased, decreased, or remained the same relative to the value.

31. The method of any preceding clause, further comprising: causing the actuator to change the position of the link from the adjacent preselected position to a second adjacent preselected position of the plurality of preselected positions based at least in part on the determined second control command.

32. A control system for controlling a link configured to operably couple an engine to an engine mounting structure of a vehicle, the control system comprising: one or more sensors; an actuator operably couplable with the link, the actuator being operable to change an inclination angle of the link; and one or more controllers communicatively coupled with the one or more sensors and the actuator and having one or more memory devices and one or more processing devices, the one or more memory devices storing computer-readable instructions that can be executed by the one or more processing devices to perform operations, in performing the operations, the one or more processing devices are configured to: determine a control command based at least in part on an output received from the one or more sensors; and cause the actuator to change the inclination angle of the link based at least in part on the determined control command.

33. The control system of any preceding clause, wherein the vehicle is an aircraft, the engine support structure is a pylon of the aircraft, and the engine is an aircraft gas turbine engine.

34. The control system of any preceding clause, wherein the output received from the one or more sensors comprises one or more operating parameters, and wherein in determining the control command based at least in part on the output received from the one or more sensors, the one or more controllers are configured to: determine the inclination angle of the link based at least in part on the received one or more operating parameters; set a target inclination angle based at least in part on the received one or more operating parameters; and determine a difference between the determined inclination angle and the target inclination angle, and wherein the control command is determined by the one or more controllers based at least in part on the difference between the determined inclination angle and the target inclination angle.

35. The control system of any preceding clause, wherein the one or more controllers are configured to: receive, from the one or more sensors, the output, the output being indicative of a value of an operating parameter; and determine whether the value is within a predetermined range of a previous value of the operating parameter, the previous value of the operating parameter being received as part of a previous output received from the one or more sensors, and wherein the control command is determined by the one or more controllers in response to whether the received value is within the predetermined range of the previous value.

36. The control system of any preceding clause, wherein the actuator is operable to change the link to a plurality of preselected inclination angles, and wherein in causing the actuator operably coupled with the link to change the inclination angle of the link based at least in part on the determined control command, the one or more controllers cause the actuator to change the inclination angle of the link to a second preselected inclination angle of the plurality of preselected inclination angles.

37. The control system of any preceding clause, wherein the one or more controllers are further configured to: receive, from the one or more sensors, a subsequent output, the subsequent output being indicative of a subsequent value of the operating parameter; determining whether the subsequent value has increased or decreased relative to the value; and determining a second control command in response to whether the subsequent value has increased or decreased relative to the value.

38. A computer readable medium comprising computer-executable instructions, which, when executed by one or more processors of an engine controller, cause the engine controller to: cause an actuator operably couplable with a link configured to operably couple an engine with an engine mounting structure to vary an inclination angle of the link to a plurality of preselected inclination angles; receive, for respective ones of the plurality of preselected inclination angles, a value for one or more operating parameters associated the respective ones of the plurality of preselected inclination angles; generate a dataset relating the plurality of preselected inclination angles to the values for the one or more operating parameters, the received values depending at least in part on the inclination angle associated therewith; and selecting the inclination angle based at least in part on the dataset, the selected inclination angle corresponding to a value for one of the one or more operating parameters.

39. The computer readable medium of any preceding clause, wherein the computer-executable instructions, which, when executed by the one or more processors of the engine controller, further cause the engine controller to: cause the actuator to vary the inclination angle of the link to the selected inclination angle.

40. The computer readable medium of any preceding clause, wherein the engine is an aircraft engine and the engine mounting structure is a pylon on a wing of an aircraft, and wherein the computer-executable instructions, which, when executed by the one or more processors of the engine controller, further cause the engine controller to: determine whether the aircraft engine is operating in a stable operation phase, wherein the stable operation phase comprises at least one of climb, cruise, and descent.

41. The computer readable medium of any preceding clause, wherein the value for the one or more operating parameters received for the respective ones of the plurality of preselected inclination angles is a specific fuel consumption of the engine, and wherein the selected inclination angle corresponds to the value from the dataset that minimizes the specific fuel consumption of the engine.

42. The computer readable medium of any preceding clause, wherein the value for the one or more operating parameters received for the respective ones of the plurality of preselected inclination angles is a strain on a backbone of the engine, and wherein the selected inclination angle corresponds to the value from the dataset that minimizes the strain on the backbone of the engine.

This written description uses examples to describe the presently disclosed subject matter, including the best mode, and also to enable any person skilled in the art to practice the presently disclosed subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine-mounting linkage system, comprising:
a plurality of engine mounting-links configured to couple an engine frame to an engine support structure of an aircraft, wherein the plurality of engine-mounting links comprises a forward link that is connectable to a forward frame portion of the engine frame and the engine support structure, and an aft link that is connectable to an aft frame portion of the engine frame and the engine support structure, wherein force vectors extending from the forward link intersect at a forward focal point, and force vectors extending from the aft link intersect at an aft focal point; and
an actuator that is connectable to the engine support structure and one of the plurality of engine-mounting links, or to the engine support structure and the engine frame, wherein the actuator, when actuated, changes an inclination angle $\theta$ of at least one of the plurality of engine-mounting links from a first inclination angle $\theta$ to a second inclination angle $\theta$ such that a location of at least one of the forward focal point or the aft focal point is moved, and the engine frame shifts forward or aft with respect to the engine support structure such that the engine frame is substantially horizontal with respect to the engine support structure at the first inclination angle $\theta$ and at the second inclination angle $\theta$.

2. The engine-mounting linkage system of claim 1, wherein the forward link is connected to the forward frame portion of the engine frame and the engine support structure of an aircraft.

3. The engine-mounting linkage system of claim 2, wherein the actuator is connected to the forward link and the engine support structure of the aircraft.

4. The engine-mounting linkage system of claim 2, wherein the actuator is connected to the forward frame portion of the engine frame and the engine support structure of the aircraft.

5. The engine-mounting linkage system of claim 1, wherein the aft link is connected to the aft frame portion of the engine frame and the engine support structure of an aircraft.

6. The engine-mounting linkage system of claim 5, wherein the actuator is connected to the aft link and the engine support structure of the aircraft.

7. The engine-mounting linkage system of claim 2, wherein the actuator is connected to the aft frame portion of the engine frame and the engine support structure of the aircraft.

8. The engine-mounting linkage system of claim 1, wherein the actuator, when actuated, changes an inclination angle $\theta$ of the forward link.

9. The engine-mounting linkage system of claim 1, wherein the actuator, when actuated, changes an inclination angle $\theta$ of the aft link.

10. The engine-mounting linkage system of claim 1, wherein the actuator comprises a linear actuator or a rotary actuator.

11. An engine assembly secured to an aircraft, the engine assembly, comprising:
an aircraft engine comprising an engine frame that has a forward frame portion and an aft frame portion;
an engine support structure that defines a location for mounting the aircraft engine to an aircraft;
a forward link connected to the forward frame portion of the engine frame and to the engine support structure of the aircraft, wherein force vectors extending from the forward link intersect at a forward focal point;
an aft link connected to the aft frame portion of the engine frame and to the engine support structure of the aircraft, wherein force vectors extending from the aft link intersect at an aft focal point; and
an actuator connected to the engine support structure and the forward link, or to the engine support structure and the aft link, or to the engine support structure and the forward frame portion of the engine frame, or to the engine support structure and the aft frame portion of the engine frame;
wherein the actuator, when actuated, changes an inclination angle $\theta$ of at least one of the forward link and/or the aft link from a first inclination angle $\theta$ to a second inclination angle $\theta$ such that a location of at least one of the forward focal point or the aft focal point is moved, and the engine frame shifts forward or aft with respect to the engine support structure such that the engine frame is substantially horizontal with respect to the engine support structure at the first inclination angle $\theta$ and at the second inclination angle $\theta$.

12. The engine assembly of claim 11, wherein the forward link has an adjustable inclination angle $\theta$, and/or wherein the aft link has an adjustable inclination angle $\theta$.

13. The engine assembly of claim 11, wherein the actuator comprises a linear actuator or a rotary actuator.

14. The engine assembly of claim 11, comprising:
a controller configured to output a control command responsive to an input from a sensor, the control command operable to actuate the actuator.

15. A method of changing an inclination angle $\theta$ of an engine-mounting link, the method comprising:
receiving an input from a sensor; and
outputting a control command responsive to the input from the sensor, the control command operable to actuate an actuator that, when actuated, causes a change to an inclination angle $\theta$ from a first inclination angle $\theta$ to a second inclination angle $\theta$ of at least one of a plurality of engine-mounting links that connect an engine frame of an aircraft engine to an engine support structure that defines a location for mounting the aircraft engine to an aircraft;
wherein the plurality of engine-mounting links comprises a forward link that is connected to a forward frame portion of the engine frame and the engine support structure, and an aft link that is connected to an aft frame portion of the engine frame and the engine support structure, wherein force vectors extending from the forward link intersect at a forward focal point, and force vectors extending from the aft link intersect at an aft focal point; and wherein the actuator is connected to the engine support structure and one of and the plurality of engine-mounting links, or to the engine support structure and the engine frame, and changing the inclination angle of the at least one of the plurality of the engine-mounting links moves a location of at least one of the forward focal point or the aft focal point and shifts the engine frame forward or aft with respect to the engine support structure such that the engine frame is substantially horizontal with respect to the engine support structure at the first inclination angle $\theta$ and at the second inclination angle $\theta$.

16. The method of claim 15, wherein the actuator is connected to the forward link and the engine support structure of the aircraft, or wherein the actuator is connected to the forward frame portion of the engine frame and the engine support structure of the aircraft.

17. The method of claim 15, wherein the actuator is connected to the aft link and the engine support structure of the aircraft, or wherein the actuator is connected to the aft frame portion of the engine frame and the engine support structure of the aircraft.

18. The method of claim 15, comprising:

determining the control command based at least in part on a thrust load $F_T$ and/or an inlet load Fi incident upon the engine frame, the thrust load $F_T$ and/or an inlet load $F_I$ determined based at least in part using the input from the sensor.

19. The method of claim 15, comprising:

determining a specific fuel consumption of the aircraft engine based at least in part on the input from the sensor, and determining the control command based at least in part on the specific fuel consumption of the aircraft engine.

20. The method of claim 15, wherein the change to the inclination angle $\theta$ reduces specific fuel consumption of the aircraft engine.

* * * * *